United States Patent
Ozawa

(10) Patent No.: US 11,317,200 B2
(45) Date of Patent: Apr. 26, 2022

(54) SOUND SOURCE SEPARATION SYSTEM, SOUND SOURCE POSITION ESTIMATION SYSTEM, SOUND SOURCE SEPARATION METHOD, AND SOUND SOURCE SEPARATION PROGRAM

(71) Applicant: UNIVERSITY OF YAMANASHI, Yamanashi (JP)

(72) Inventor: Kenji Ozawa, Kofu (JP)

(73) Assignee: UNIVERSITY OF YAMANASHI, Yamanashi (JP)

( * ) Notice: Subject to any disclaimer, the term of this patent is extended or adjusted under 35 U.S.C. 154(b) by 0 days.

(21) Appl. No.: 17/266,397

(22) PCT Filed: Jul. 10, 2019

(86) PCT No.: PCT/JP2019/027241
§ 371 (c)(1),
(2) Date: Feb. 5, 2021

(87) PCT Pub. No.: WO2020/031594
PCT Pub. Date: Feb. 13, 2020

(65) Prior Publication Data
US 2021/0297773 A1    Sep. 23, 2021

(30) Foreign Application Priority Data

Aug. 6, 2018    (JP) .............................. JP2018-147470

(51) Int. Cl.
*H04R 1/40*    (2006.01)
*G10L 21/0272*    (2013.01)
*G10L 25/51*    (2013.01)

(52) U.S. Cl.
CPC .......... *H04R 1/406* (2013.01); *G10L 21/0272* (2013.01); *G10L 25/51* (2013.01)

(58) Field of Classification Search
None
See application file for complete search history.

(56) References Cited

U.S. PATENT DOCUMENTS

| 10,650,841 B2 | 5/2020 | Mitsufuji | |
| 2013/0287225 A1* | 10/2013 | Niwa | H04R 3/00 381/92 |

(Continued)

FOREIGN PATENT DOCUMENTS

| JP | S63044189 A | 2/1988 |
| JP | 2018036359 A | 3/2018 |

OTHER PUBLICATIONS

Ando, Akio, et al.; "Separation of Sound Sources Propagated in the Same Direction"; IEICE Transactions on Fundamentals of Electronics, Communications, and Computer Sciences; vol. E88-A; No. 7; pp. 1665-1672; Jul. 2005 (8 pages).

(Continued)

*Primary Examiner* — Paul W Huber
(74) *Attorney, Agent, or Firm* — Osha Bergman Watanabe & Burton LLP

(57) ABSTRACT

A sound source separation system includes: a controller that: acquires pieces of sound collection data with microphones that collect sounds output from first and second sound sources. The first sound source is at a first position at which effective distances from the microphones are equal and the second sound source is at a different position. The controller further acquires, based on the sound collection data, frequency spectra in two dimensions of a circumferential direction of a circle and a time direction. The first position is a center of the circle and each of the effective distances is a radius of the circle. The controller further separates, from the frequency spectra, a first sound source spectrum and a second sound source spectrum.

10 Claims, 12 Drawing Sheets

(56) References Cited

U.S. PATENT DOCUMENTS

2015/0296318 A1* 10/2015 Honda ................... H04R 3/005
                                                        381/17
2019/0069111 A1*  2/2019 Tammi ................... H04R 3/005
2021/0020190 A1*  1/2021 Hiroe .................... G01S 3/8083

OTHER PUBLICATIONS

International Search Report issued in corresponding International Application No. PCT/JP2019/027241, dated Sep. 10, 2019, with translation (3 pages).
Written Opinion issued in corresponding International Application No. PCT/JP2019/027241, dated Sep. 10, 2019 (3 pages).

* cited by examiner

CIRCUMFERENTIAL DIRECTION ANGULAR FREQUENCY (rad)

SOUND SOURCE SEPARATION SYSTEM, SOUND SOURCE POSITION ESTIMATION SYSTEM, SOUND SOURCE SEPARATION METHOD, AND SOUND SOURCE SEPARATION PROGRAM

TECHNICAL FIELD

The present invention relates to a sound source separation system, a sound source position estimation system, a sound source separation method, and a sound source separation program.

BACKGROUND ART

In the related art, a technology for separating sounds output from a plurality of sound sources into sounds for the sound sources has been known. For example, Patent Literature 1 discloses a technology for separating sound sources by collecting sounds output from a plurality of sound sources by a microphone array including a plurality of microphones and performing image signal processing on a spatiotemporal sound pressure distribution image obtained from a sound pressure waveform.

CITATIONS LIST

Patent Literature

Patent Literature 1: Japanese Unexamined Patent Publication No. 2018-36359

In the technology disclosed in Patent Literature 1, the collected sounds are separated for the sound source present in a first direction and the sound source present in a direction different from the first direction when viewed from the microphone array. On the other hand, characteristic sound collection results are obtained when the sound sources are present at positions at which distances from the plurality of microphones are equal in the sound collection using the plurality of microphones, but the characteristic sound collection results have not been fully used in the technology of the related art.

One or more embodiments of the present invention provide a technology capable of effectively using characteristic sound collection results when sound sources are present at positions at which distances from a plurality of microphones are equal.

SUMMARY

A sound source separation system of one or more embodiments includes a sound collection data acquisition unit (i.e., a controller) that acquires pieces of sound collection data by collecting sounds output from a first sound source present at a first position at which effective distances from a plurality of microphones are equal and a second sound source present at a position other than the first position by the plurality of microphones, a frequency spectrum acquisition unit (i.e., the controller) that acquires frequency spectra in two dimensions of a circumferential direction of a circle of which the first position is a center and the effective distance is a radius and a time direction based on the pieces of sound collection data, and a sound source separation unit (i.e., the controller) that separates a first sound source spectrum which is a spectrum of the sounds output from the first sound source and a second sound source spectrum which is a spectrum of the sounds output from the second sound source from each other based on the frequency spectra.

That is, when the plurality of microphones is present at the positions at which the effective distances from the first sound source present at the first position are equal, the sound output from the first sound source has an equal phase in all of the plurality of microphones. Thus, when the pieces of sound collection data from the microphones are arranged in the circumferential direction of the circle of which the first position is the center and the effective distance between the microphone and the first sound source is the radius and the pieces of sound collection data are plotted in the time direction, the sound pressure changes only in the time direction and does not change in the circumferential direction. Accordingly, when Fourier transform is performed on such pieces of sound collection data in the two dimensions of the circumferential direction and the time direction, the frequency spectrum (first sound source spectrum) having values only in a region in which a frequency in the circumferential direction is zero and does not have values in a region of another frequency in the circumferential direction is obtained.

On the other hand, the sound output from the second sound source present at the position other than the first position has a phase corresponding to the distance between the second position and each microphone, and the sounds observed at the same time in the microphones have different phases. Thus, when the pieces of sound collection data from the microphones are arranged in the circumferential direction of the circle of which the first position is the center and the effective distance between the microphone and the first sound source is the radius and the pieces of sound collection data are plotted in the time direction, the sound pressure changes in both the circumferential direction and the time direction. Accordingly, when Fourier transform is performed on such pieces of sound collection data in the two dimensions of the circumferential direction and the time direction, the frequency spectrum (second sound source spectrum) capable of having non-zero values in both the circumferential direction and the time direction is obtained.

Thus, when the frequency spectrum in the circumferential direction and the time direction are acquired based on the pieces of sound collection data of the sounds output by the first sound source and the second sound source, the spectrum in a state in which the spectra of the sounds output from both the sound sources are overlapped are obtained, but both the spectra can be clearly distinguished. That is, since the spectrum of the sound output from the first sound source is localized only in the region in which the frequency in the circumferential direction is zero, the first sound source spectrum and the second sound source spectrum can be easily separated based on the spectrum of the region.

According to the above configuration, the spectra of the plurality of sound sources can be separated by effectively using the characteristics of the first sound source spectrum obtained when the sound source is present at the first position at which the effective distances from the plurality of microphones are equal. As a result, it is possible to acquire the spectrum for each sound source in an environment in which the plurality of sound sources is present together. In this specification, expressions such as the "distances from the plurality of microphones are equal" or the "plurality of microphones present at the equal distance" includes a case regarded as being equivalent to a case where the distances are equal by correcting the pieces of sound collection data of the plurality of microphones even when actual distances are not equal, and may be described as the "effective distance are equal".

A sound source position estimation system of one or more embodiments may include an estimation target frequency spectrum acquisition unit that collects a sound from an estimation target sound source by a plurality of microphones of which effective distances from a first position are equal, and converts the collected sounds into estimation target frequency spectra which are two-dimensional frequency spectra in a circumferential direction of a circle of which the first position is a center and the effective distance is a radius and a time direction, a reference data acquisition unit that acquires pieces of reference data in which reference frequency spectra when a sound output from a reference sound source is collected by the plurality of microphones and is converted into the two-dimensional frequency spectra are associated with positions of the reference sound source, and an estimation target sound source position estimation unit that estimates that the estimation target sound source is present at the position of the reference sound source associated with the reference frequency spectrum when the estimation target frequency spectrum and the reference frequency spectrum are similar to each other. The first position and the position other than the first position may be included in the positions of the reference sound source associated with the reference frequency spectra.

That is, the first sound source spectrum of the sound output from the first sound source present at the first position and the frequency spectrum of the sound output from the sound source present at the position other than the first position are clearly different spectra. Accordingly, when the frequency spectra of the sound source present at the plurality of positions are used as the reference frequency spectra, a relationship between the reference frequency spectrum and the positions of the sound source is associated, and the first position and the position other than the first position are included in the plurality of positions, pieces of reference data for estimating the sound source position can be generated.

The positions associated with the reference frequency spectra include the first position and the position other than the first position, and thus, the pieces of reference data can be defined such that the positions of the sound source are clearly changed between the first position and the other positions. Accordingly, the position of the estimation target sound source can be accurately estimated by specifying the reference frequency spectrum similar to the estimation target spectrum and estimating that the estimation target sound source is present at the position associated with the reference frequency spectrum. In particular, it is possible to accurately specify whether or not the estimation target sound source is present at the first position. With the above configuration, the position of the estimation target sound source can be estimated by effectively using the characteristics of the first sound source spectrum obtained when the sound source is present at the first position at which the distances from the plurality of microphones are equal.

A sound source position estimation system of one or more embodiments may include a sound collection unit that acquires pieces of sound collection data by collecting sounds by a plurality of microphones, a sound collection data correction unit that performs processing of setting a plurality of candidate positions and correcting a sound collection result for each microphone in a time direction so as to be equivalent to a sound collection result when effective distances from the plurality of microphones to the candidate position are equal for the plurality of candidate positions, a candidate spectrum acquisition unit that acquires frequency spectra in two dimensions of a circumferential direction of a circle of which the candidate position is a center and the effective distance is a radius and the time direction for each of the plurality of candidate positions, and a position estimation unit that estimates that a sound source is present at the candidate position at which the frequency spectrum in a region in which a frequency in the circumferential direction is zero is maximized.

That is, when the sound collection results of the plurality of microphones are corrected in the time direction, it is possible to acquire pieces of data equivalent to the pieces of sound collection data collected in a situation in which the distances between the microphones and the sound source are different. The frequency spectrum of the sound source present at the position at which the effective distances from the plurality of microphones are equal becomes the spectrum localized only in the region in which the frequency in the circumferential direction is zero, and becomes an extremely characteristic spectrum. Accordingly, when the correction is performed for the plurality of candidate positions such that the effective distances from the plurality of microphones to the candidate position are equal and the characteristic spectrum is obtained in the candidate spectrum, it is possible to estimate that the sound source is present at the candidate position corresponding to the candidate spectrum. With the above configuration, the position of the estimation target sound source can be estimated by effectively using the characteristics of the first sound source spectrum obtained when the sound source is present at the first position at which the effective distances from the plurality of microphones are equal.

DETAILED DESCRIPTION OF EMBODIMENTS

Here, embodiments of the present invention will be described in the following order.
(1) Principle:
(2) Configuration of sound source separation system:
(3) Configuration of sound source position estimation system:
(4) Configuration of second sound source position estimation system:
(5) Other embodiments:

(1) Principle

Figure 1A:
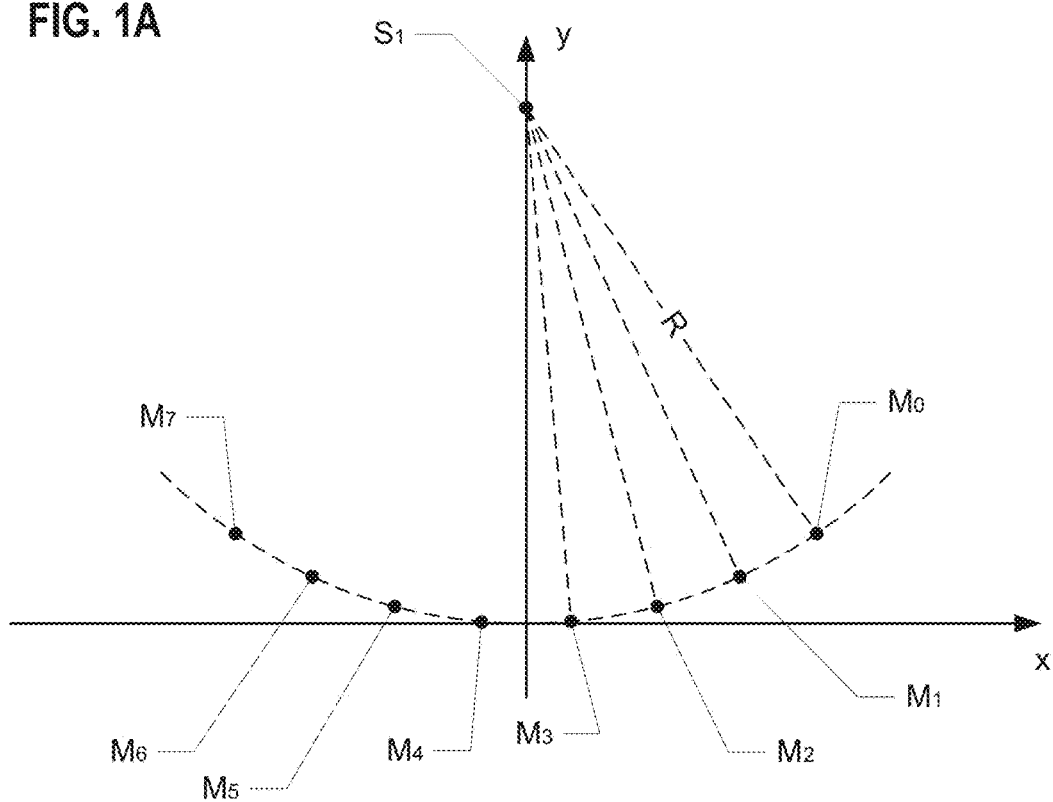
FIGS. 1A and 1B are diagrams illustrating a scene in which characteristics appear in a frequency spectrum.

The embodiments of the present invention are achieved by effectively using characteristic sound collection results when a sound source is present at a position at which distances from a plurality of microphones are equal. FIGS. 1A, 1B, and 2A to 2D are diagrams illustrating a case where eight microphones are used as an example for describing the principle of obtaining the characteristic sound collection results. FIG. 1A is a diagram illustrating positions of a plurality of microphones $M_0$ to $M_7$ and a position of a first sound source $S_1$. In FIG. 1A, the plurality of microphones $M_0$ to $M_7$ is arranged at an equal distance from the first sound source $S_1$. That is, the plurality of microphones $M_0$ to $M_7$ is arranged on a circumference of a circle having a radius R with the first sound source $S_1$ as a center.

In this example, distances between the plurality of microphones $M_0$ to $M_7$ are equal and these microphones are arranged at an equal interval, but these microphones may not be necessarily at an equal interval. In this example, a coordinate system in which a tangent of a circle passing through a center of the plurality of microphones $M_0$ to $M_7$ arranged at an equal interval, that is, a point on a circumference of a circle present at an equal distance from the microphones $M_3$ and $M_4$ is defined as an x-axis and a perpendicular line to the tangent of the circle is a y-axis system is defined. In this axis, the first sound source $S_1$ is a point on the y-axis.

Sounds output from the first sound source $S_1$ travel isotropically, as spherical waves, in all directions. Accordingly, when the plurality of microphones $M_0$ to $M_7$ is arranged at positions of an equal distance from the first sound source $S_1$, sounds collected by the microphones $M_0$ to $M_7$ are the same. As stated above, when the plurality of microphones $M_0$ to $M_7$ is arranged at the positions of the equal distance from the first sound source $S_1$, the position of the first sound source $S_1$ is called a first position.

Figure 2A:
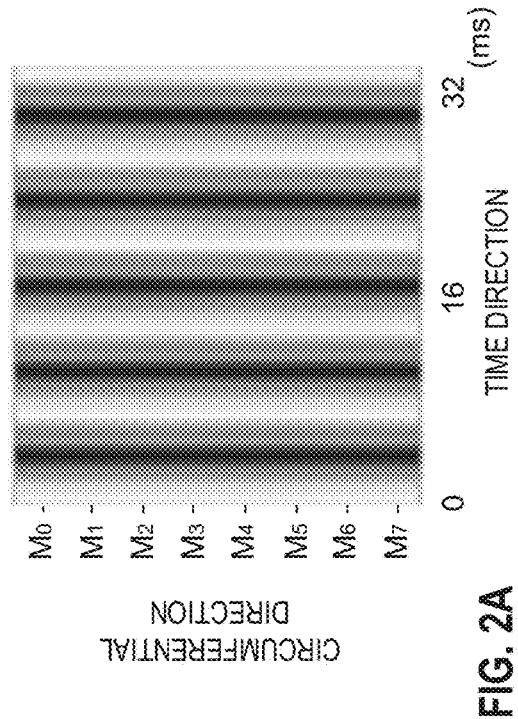
FIGS. 2A and 2C are diagrams illustrating sound collection results.

FIG. 2A is a diagram illustrating the sound collection results of the microphones $M_0$ to $M_7$. In FIG. 2A, the microphones $M_0$ to $M_7$ are arranged in a vertical direction, and a horizontal direction is depicted as a time direction. In FIG. 2A, the sound collection results of the plurality of microphones $M_0$ to $M_7$ are represented so as to be arranged in the vertical direction without any gaps by converting heights of amplitudes of sound pressures collected by the microphones $M_0$ to $M_7$ into heights of luminance of an image and expanding amplitudes of the microphones $M_0$ to $M_7$ in the vertical direction. Since the plurality of microphones $M_0$ to $M_7$ is arranged on the circumference of the circle having the radius R with the first sound source $S_1$ as the center as described above, it can be said that the plurality of microphones $M_0$ to $M_7$ is arranged in a circumferential direction of the circle. Thus, when the sound collection results of the microphones $M_0$ to $M_7$ are arranged in the vertical direction as illustrated in FIG. 2A, it can be said that the vertical direction is the circumferential direction.

Figure 2C:
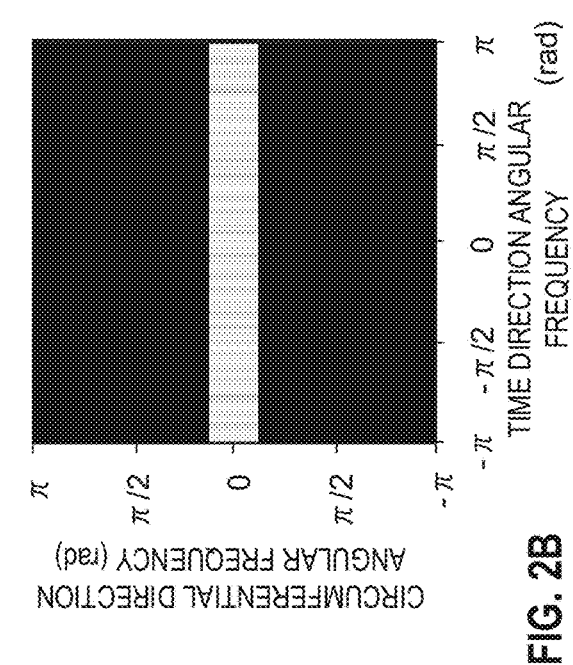
Figure 2B:
FIGS. 2B and 2D are diagrams illustrating frequency spectra.

FIG. 2B illustrates results obtained by performing Fourier transform on pieces of sound collection data spreading in the circumferential direction and the time direction as illustrated in FIG. 2A. When the Fourier transform is performed, a frequency spectrum of the sound collection result in each of the circumferential direction and the time direction is obtained. In FIG. 2B, the frequency spectrum is represented with an angular frequency normalized by a sampling frequency in each of the circumferential direction and the time direction ($\omega=2\pi f/fs$: $\omega$ is a normalized angular frequency, f is a frequency, and fs is a sampling frequency) as a unit. In FIG. 2B, a power of the frequency spectrum is represented by the luminance, and a power 0 is black. As the power becomes higher, the luminance becomes higher.

As illustrated in FIG. 1A, when the plurality of microphones $M_0$ to $M_7$ is present on the circumference of the circle having the radius R with the first sound source $S_1$ as the center, the frequency spectrum is localized in a region in which the frequency in the circumferential direction is zero, and does not have values in a region in which the frequency in the circumferential direction is non-zero. On the other hand, in a region (frequency 0) in which the frequency spectrum has a significant value in the circumferential direction, the frequency spectrum has values over a full-width angular frequency in the time direction. Thus, various frequencies may be included in the time direction.

The above characteristics are caused by the fact that the plurality of microphones $M_0$ to $M_7$ is present on the circumference of the circle having the radius R with the first sound source $S_1$ as the center. That is, when the plurality of microphones $M_0$ to $M_7$ is present on the circumference of the circle having the radius R with the first sound source $S_1$ as the center, the sounds collected by all the microphones $M_0$ to $M_7$ are the same. In this case, a situation in which all the microphones $M_0$ to $M_7$ have all the same sound pressure in the circumferential direction is repeated in the entire time direction. As a result, as illustrated in FIG. 2A, the sound pressures in the circumferential direction and the time direction do not change at all in the vertical direction, but form vertical stripes that change only in the horizontal direction. This indicates that the sound pressure does not change in the circumferential direction, that is, the frequency in the circumferential direction is zero (=angular frequency 0).

Such two-dimensional sound pressure characteristics do not change even though the sound pressures are repeated infinitely in the circumferential direction. Thus, even though the Fourier transform is performed on the assumption that the data in the circumferential direction illustrated in FIG. 2A repeats periodically, there is no room for an error in the characteristics. As a result, it can be seen that in the frequency spectrum after the Fourier transform, the frequency spectrum is localized in the region in which the frequency in the circumferential direction is zero and the characteristics of each of the microphones $M_0$ to $M_7$ can be accurately extracted when only the localized frequency spectrum is extracted.

Figure 1B:
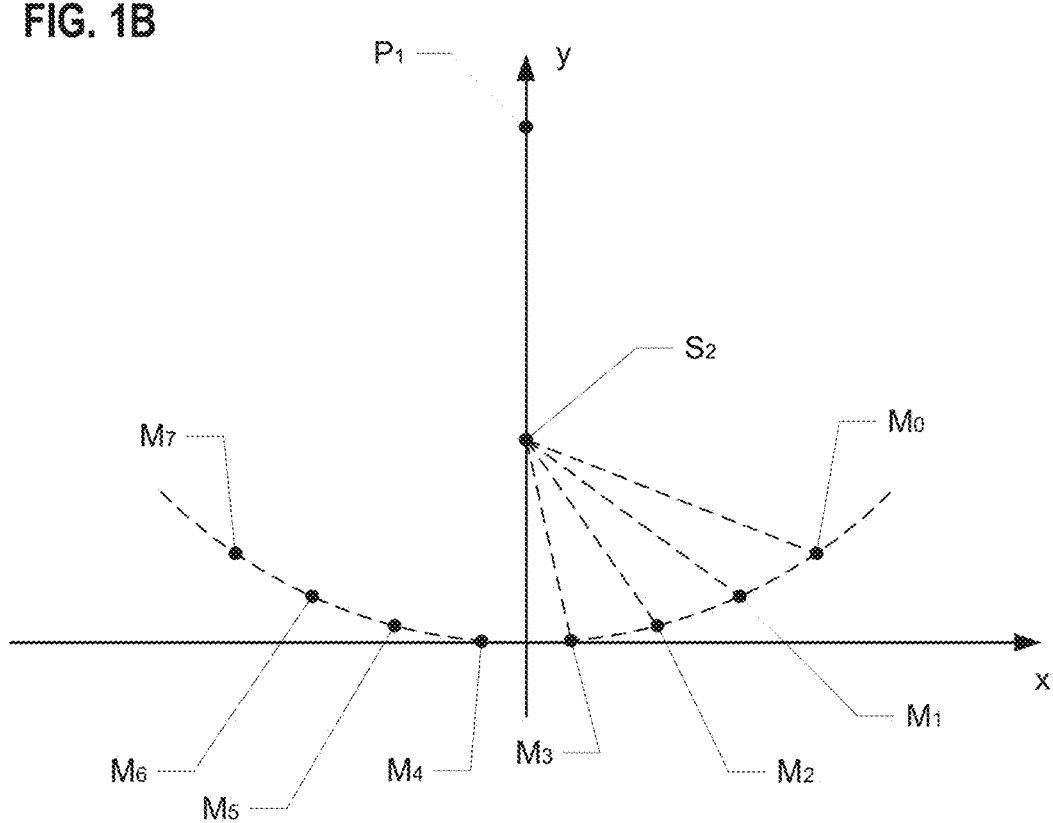

On the other hand, when the sound source is not present at the first position, the characteristics of the frequency spectrum are extremely different. FIG. 1B illustrates an example in which a second sound source $S_2$ is disposed at a position on the y-axis different from a first position $P_1$ in a state in which the plurality of microphones $M_0$ to $M_7$ is arranged at the same position as FIG. 1A. In FIG. 1B, the second sound source $S_2$ is disposed at a position closer to the microphones than the first position $P_1$. Thus, distances from the second sound source $S_2$ to the plurality of microphones $M_0$ to $M_7$ are not constant.

Accordingly, even though sounds output from the second sound source $S_2$ travel isotropically, as a spherical wave, in all the directions, the sounds collected by the microphones $M_0$ to $M_7$ are not the same (however, the sounds are the same for the microphones ($M_0$, $M_7$, and the like) present at positions symmetrical with respect to the y-axis).

FIG. 2C is a diagram illustrating the sound collection results of the microphones $M_0$ to $M_7$, and is illustrated in the same format as FIG. 2A. In the example illustrated in FIG. 1B, the distances from the second sound source $S_2$ to the plurality of microphones $M_0$ to $M_7$ are different. Thus, when the sound pressures of the plurality of microphones $M_0$ to $M_7$ are compared, temporal positions at the same sound pressure are slightly different as illustrated in FIG. 2C.

Figure 2D:
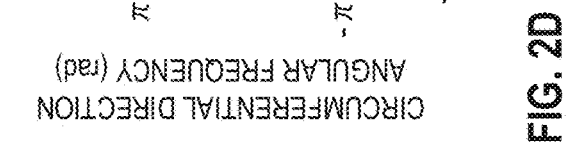

FIG. 2D illustrates results obtained by performing Fourier transform on the pieces of sound collection data spreading in the circumferential direction and the time direction as illustrated in FIG. 2C, and is illustrated in the same format as FIG. 2B.

As illustrated in FIG. 1B, when the second sound source $S_2$ is present at the position different from the first position $P_1$ and the distances between the plurality of microphones $M_0$ to $M_7$ and the second sound source $S_2$ are not constant, the frequency spectrum is distributed in both the circumferential direction and the time direction. That is, when the distances from the second sound source $S_2$ to the plurality of microphones $M_0$ to $M_7$ are not constant, the sounds collected by the microphones $M_0$ to $M_7$ are slightly different. In this case, the sound pressures change in the circumferential direction at the same time. Accordingly, the frequency spectrum is in a state of not being localized in the region in which the frequency is zero in the circumferential direction.

In a case where there is also a change in the sound pressure in the circumferential direction, when the Fourier transform is performed on the assumption that the sound pressures are periodically repeated in the circumferential direction, a steep change portion is generated at a boundary of this period. As a result, when the Fourier transform is performed on the assumption that the data in the circumferential direction illustrated in FIG. 2C is periodically repeated, the frequency spectrum spreads mainly due to the steep change at the boundary portion.

As a result, the frequency spectrum of the second sound source $S_2$ has a spread in both the circumferential direction and the time direction in FIG. 2D. Thus, the frequency spectrum of the second sound source $S_2$ is the spectrum significantly different from the frequency spectrum of the first sound source $S_1$ present at the first position $P_1$. As stated above, the frequency spectrum when the sound source is present at the first position $P_1$ at which the distances from the plurality of microphones are equal becomes the characteristic frequency spectrum significantly different from the frequency spectrum when the sound source is present at another position. Thus, when such characteristics of the frequency spectrum are effectively used, the separation of the sound sources and the estimation of the positions of the sound sources can be performed. That is, in a situation in which the first sound source $S_1$ and the second sound source $S_2$ are present together, the frequency spectrum of the first sound source $S_1$ can be easily separated from the frequency spectrum. When the frequency spectrum localized in the region in which the frequency in the circumferential direction is zero is obtained, it is possible to estimate that the sound source is present at the first position $P_1$.

In the plurality of microphones $M_0$ to $M_7$ illustrated in FIGS. 1A and 1B, the pieces of sound collection data which are the sound collection results by the microphones present at positions line-symmetrical with respect to the y-axis are the same. Accordingly, the sound collection data of the microphone that is not actually present can also be generated from the sound collection data of the microphone that actually is present by the configuration in which one of the pieces of same sound collection data is generated from the other. For example, the pieces of sound collection data of the microphones $M_0$ to $M_3$ may be generated by copying the pieces of sound collection data of the microphones $M_7$ to $M_4$.

Figure 3A:
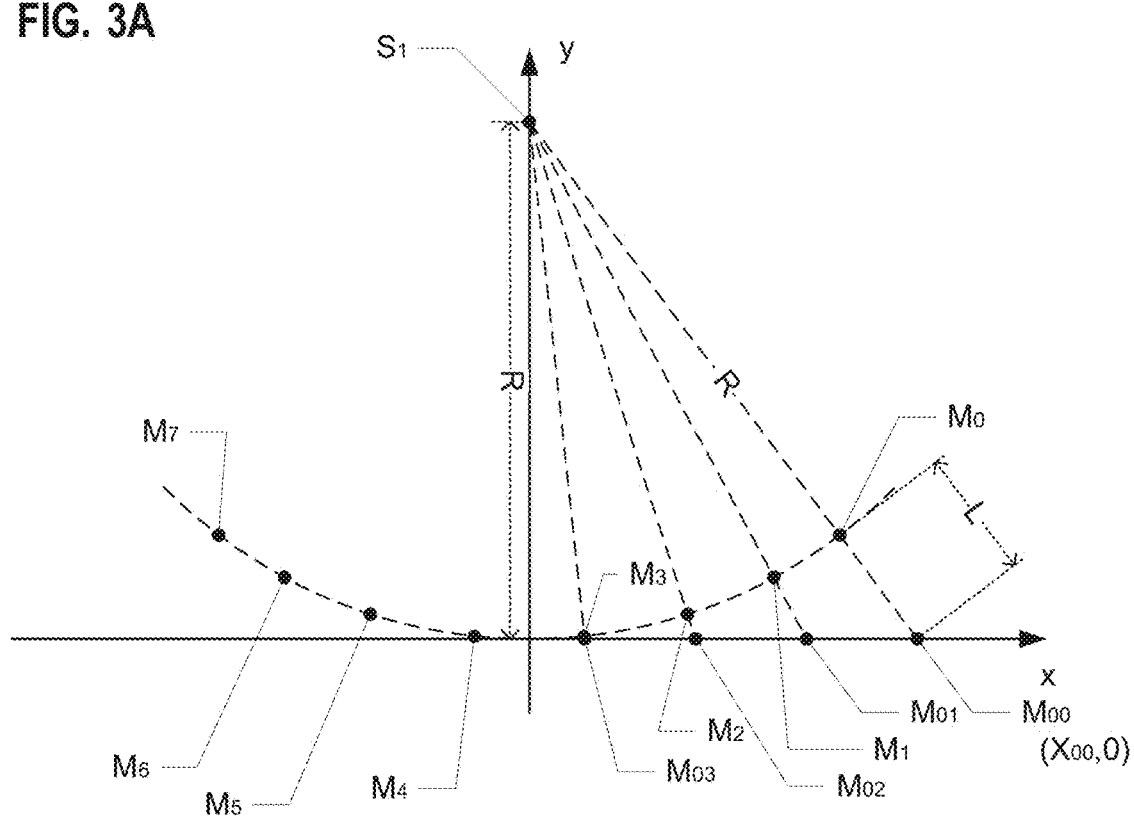
FIG. 3A and FIG. 3B are diagrams illustrating a scene in which characteristics appear in a frequency spectrum.

Even when the plurality of microphones $M_0$ to $M_7$ is not actually arranged on the circumference of the circle having the radius R with the first sound source $S_1$ as the center, the pieces of sound collection data can be corrected such that the plurality of microphones $M_0$ to $M_7$ is regarded as being arranged on the circumference. FIG. 3A illustrates an example in which microphones $M_{00}$ to $M_{0a}$ are arranged at an equal distance on the x-axis. Since $M_0$ to $M_7$ are regarded as being arranged on the above-mentioned circumference, the microphones may be moved onto the above-mentioned circle by being moved in parallel with the y-axis.

In this situation, when the first sound source $S_1$ is present on the y-axis, the distances from the first sound source $S_1$ to the microphones $M_{00}$ to $M_{03}$ are not equal. However, the microphones $M_{00}$ to $M_{03}$ collect spherical waves output from the same sound source. Accordingly, when a phase is changed in the time direction, the correction is performed so as to be the same as sound collection results when the microphones $M_{00}$ to $M_{03}$ are arranged on the circumference of the circle having the radius R with the first sound source $S_1$ as the center.

For example, when a distance from the circumference of the circle having the radius R with the first sound source $S_1$ as the center to the microphone $M_{00}$ is L on a straight line extending from the microphone $M_{00}$ to the first sound source $S_1$, sound collection data of the microphone $M_{00}$ is delayed with respect to the sound collection data of the microphone $M_0$ by a phase of the distance ($2\pi f \times L/v$: f is a frequency of a sound wave, v is a velocity of the sound wave). Thus, when the amount of delay is corrected, data equivalent to the sound collection data in the microphone $M_0$ is obtained. As stated above, when correction is executed in the microphones $M_{00}$ to $M_{03}$ capable of being regarded as being present on the circumference of the circle having the radius R with the first sound source $S_1$ as the center, pieces of sound collection data equivalent to pieces of sound collection data when sounds are collected by the microphones $M_0$ to $M_3$ illustrated in FIG. 3A can be obtained.

Accordingly, the characteristic frequency spectrum illustrated in FIG. 2B is obtained by arranging the pieces of corrected sound collection data in the circumferential direction and performing the Fourier transform in two dimensions including the time direction. In the example illustrated in FIG. 3A, the pieces of sound collection data of the microphones $M_7$ to $M_4$ may be generated by copying the pieces of data of the microphones $M_0$ to $M_3$, or may be generated by arranging the microphones at the line-symmetrical positions from the microphones $M_{00}$ to $M_{03}$ with the y-axis as a reference and correcting the pieces of sound collection data.

Figure 3B:
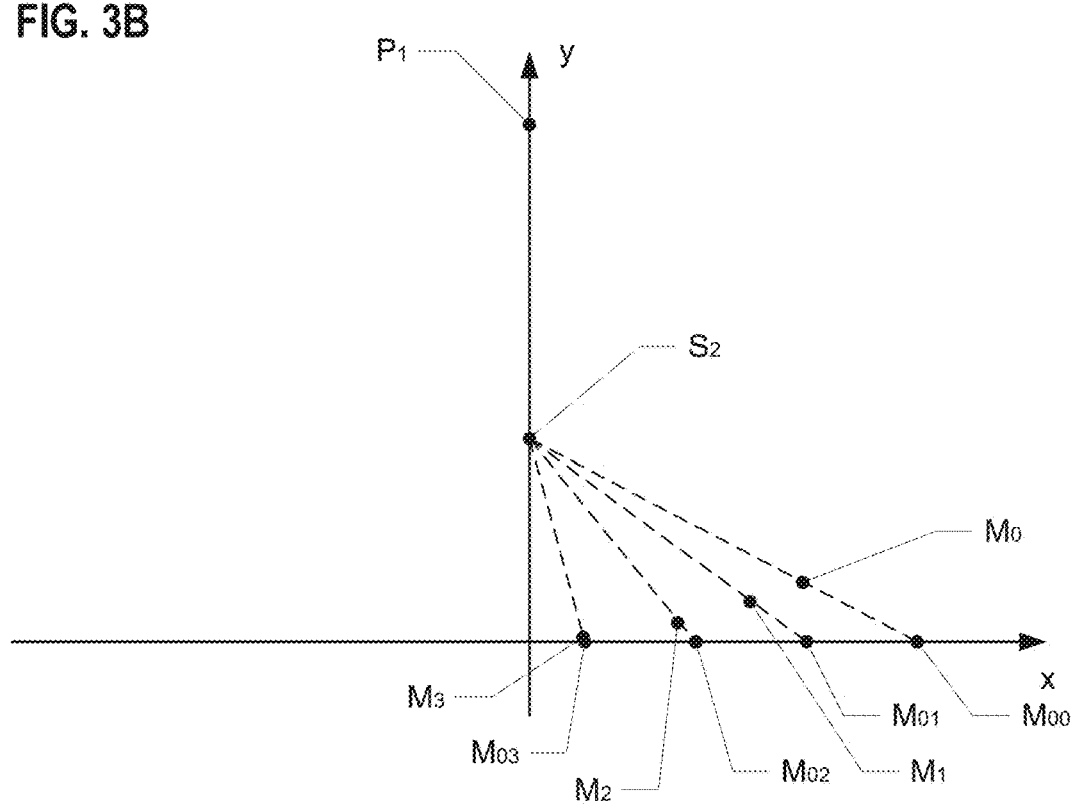

On the other hand, as illustrated in FIG. 3B, it is assumed that the second sound source $S_2$ is present at a position different from the first position $P_1$ which is the position of the first sound source $S_1$. In this case, when the correction is performed so as to be equivalent to pieces of sound collection data in a state in which the microphones are present on the circumference of the circle of which the distance from the first sound source $S_1$ is R, pieces of data equivalent to pieces of data when sound collection is performed on a straight line connecting the second sound source $S_2$ and the microphones $M_{00}$ to Moa can be acquired.

However, even though the correction for delaying the pieces of sound collection data by the same phase as in FIG. 3A is performed depending on the distances from the microphones $M_{00}$ to $M_{03}$, the correction is performed so as to be equivalent to the pieces of sound collection data at the positions of the microphones $M_0$ to $M_3$ illustrated in FIG. 3B. Thus, the distances from the second sound source $S_2$ to the microphones $M_0$ to $M_3$ are not the same. Accordingly, even though the pieces of corrected sound collection data are arranged in the circumferential direction and the Fourier transform is performed in two dimensions including the time direction, the characteristic frequency spectrum illustrated in FIG. 2B is not obtained, and the frequency spectrum having the values in the circumferential direction and the time direction is obtained as illustrated in FIG. 2D. Thus, the frequency spectrum of the second sound source $S_2$ is the spectrum significantly different from the frequency spectrum of the first sound source $S_1$ present at the first position $P_1$. Thus, when such characteristics of the frequency spectrum are effectively used, the separation of the sound sources and the estimation of the positions of the sound sources can be performed.

(2) Configuration of Sound Source Separation System

Figure 4:
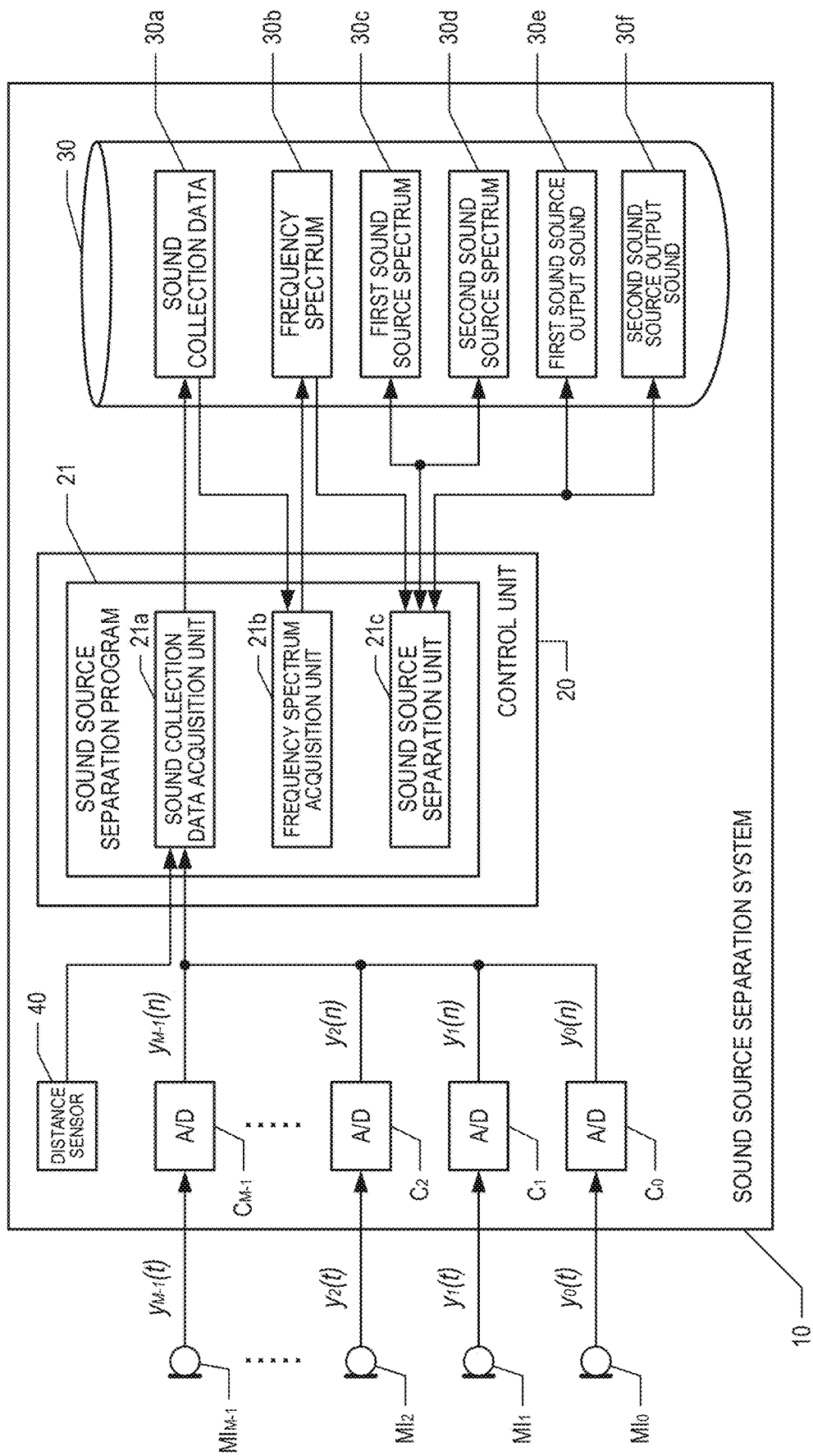
FIG. 4 is a block diagram of a sound source separation system.

FIG. 4 is a block diagram of a sound source separation system 10 according to an embodiment of the present invention. The sound source separation system 10 includes a plurality (M numbered, but M≥3) of A/D converters $C_0$ to $C_{M-1}$, a control unit 20 (i.e., the controller), a recording medium 30, and a distance sensor 40. The plurality (M numbered) of microphones $MI_0$ to $MI_{M-1}$ is connected to the A/D converters $C_0$ to $C_{M-1}$, respectively.

Although the microphones $MI_0$ to $MI_{M-1}$ are a microphone array arranged on the straight line in the present embodiment, the microphones may be arranged on a circumference having a constant distance from a position of a predetermined sound source as described above. In the present embodiment, the microphones $MI_0$ to $MI_{M-1}$ are micro electro mechanical system (MEMS) microphones, and each microphone has a sound hole for taking sounds into the microphone.

The distances between the microphones are an equal interval (distance D), and distances between centers of the sound holes are the distance D in the present embodiment.

Here, the microphones $MI_0$ to $MI_{M-1}$ are arranged in an array at an equal interval (distance D), but the microphone intervals may be unequal intervals, and the microphone is not limited to the MEMS type. The distance D is set to be an interval at which a spatial aliasing does not occur in an audible frequency band. For example, when an upper limit of an audible frequency is 20 kHz, the distance D is D<8.5 mm.

The microphones $MI_0$ to $MI_{M-1}$ output analog signals $y_0(t)$ to $y_{M-1}(t)$ indicating the sound pressures of the input sounds, respectively. The A/D converters $C_0$ to $C_{M-1}$ convert the analog signals $y_0(t)$ to $y_{M-1}(t)$ output by the microphones $MI_0$ to $MI_{M-1}$ into pieces of digital data $y_0(n)$ to $y_{M-1}(n)$, and output the pieces of converted digital data. The control unit 20 can acquire the pieces of digital data $y_0(n)$ to $y_{M-1}(n)$ via an interface (not illustrated) and use the pieces of acquired digital data for various kinds of processing.

The control unit 20 includes a CPU, a RAM, and a ROM (not illustrated), and can execute various programs stored in the recording medium 30 and the like. The control unit 20, the recording medium 30, the distance sensor 40, and the A/D converters $C_0$ to $C_{M-1}$ may be achieved by an integrated computer, or at least a part thereof may be another device. These devices may be connected by various communication lines and the like.

In the present embodiment, it is assumed that the sound source separation system 10 and the microphones $MI_0$ to $MI_{M-1}$ are mounted on a mobile terminal such as a smartphone. The control unit 20 can function as a control unit that executes various functions in the mobile terminal, and the recording medium 30 can store various kinds of data necessary for various functions in the mobile terminal. In the mobile terminal such as the smartphone having such a configuration, a sound source separation program 21 according to the present embodiment can be easily executed. That is, the mobile terminal such as the smartphone normally has an imaging function of photographs and moving images, and can execute various kinds of image processing. Since at least a part of the processing executed by the sound source separation program 21 according to the present embodiment can be executed by using the processing used for the image processing related to photographs and moving images, at least the part thereof can be easily executed on the mobile terminal such as the smartphone.

The distance sensor 40 is a sensor that outputs information indicating the distance between an object present outside the mobile terminal and the mobile terminal, and the control unit 20 can acquire information indicating the distance via an interface (not illustrated) and can specify the distance between the mobile terminal and the object. The distance sensor 40 may be achieved in various aspects, and for example, various sensors such as an ultrasonic sensor and an optical sensor can be used. An autofocus function in the imaging function of the photographs of the mobile terminal can also be used.

In the present embodiment, the control unit 20 can execute the sound source separation program 21. When the sound source separation program 21 is executed, the control unit 20 functions as a sound collection data acquisition unit 21a, a frequency spectrum acquisition unit 21b, and a sound source separation unit 21c. The sound collection data acquisition unit 21a is a program module that causes the control unit 20 to execute a function of acquiring the pieces of sound collection data obtained by collecting the sounds output from the first sound source $S_1$ present at the first position $P_1$ and the second sound source $S_2$ present at the position other than the first position $P_1$ of which the distances from the plurality of microphones $MI_0$ to $MI_{M-1}$ are equal by the plurality of microphones.

In the present embodiment, a sound source desired by a user (for example, a person who is speaking or the like) can be used as the first sound source $S_1$, and another sound source (for example, another person who is speaking, various noises, or the like) can be used as the second sound source $S_2$. The number of second sound sources $S_2$ is not limited to one. When the sound source separation program 21 is executed, the user performs adjustment such that the sound source desired by the user is disposed in front of the distance sensor 40 (direction to be measured) by changing an orientation of the mobile terminal or a position of the user himself or herself or correcting the sound collection data. In this state, the microphones $MI_0$ to $MI_{M-1}$ arranged on the straight line are arranged on the x-axis illustrated in FIG. 3A, and the sound source desired by the user is present on the y-axis. Hereinafter, the sound source desired by the user is regarded as the first sound source $S_1$.

Figure 5:
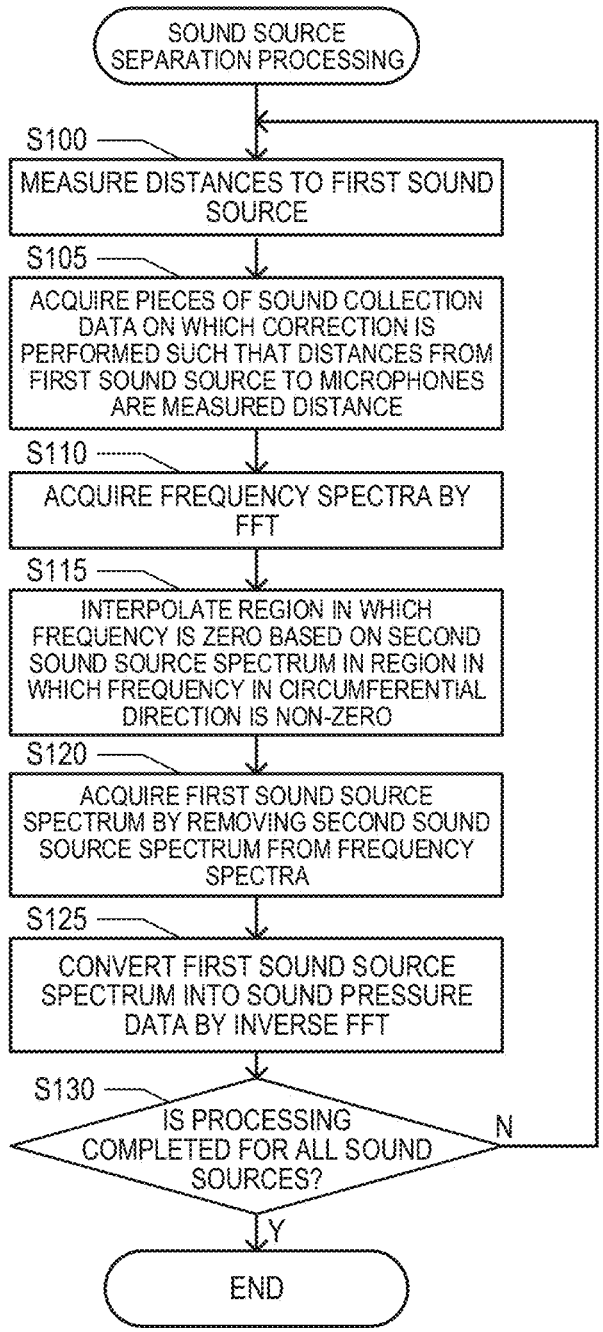
FIG. 5 is a flowchart of sound source separation processing.

In this state, the control unit 20 executes sound source separation processing illustrated in FIG. 5. When the sound source separation processing is started, the control unit 20 measures the distance R to the first sound source $S_1$ based on an output signal of the distance sensor 40 (step S100). That is, the control unit 20 specifies the distance R to the sound source that is regarded as being present in front of the mobile terminal and being as the first sound source $S_1$ by the user based on the output signal of the distance sensor 40.

Subsequently, the control unit 20 acquires pieces of sound collection data corrected such that the distances from the first sound source $S_1$ to the microphones $MI_0$ to $MI_{M-1}$ are the measured distance R (step S105). In the mobile terminal according to the present embodiment, the x-axis on which the microphones $MI_0$ to $MI_{M-1}$ are arranged, the positions of the microphones $MI_0$ to $MI_{M-1}$ on the x-axis, and a relationship between the x-axis and the y-axis are specified in advance. Thus, the control unit 20 acquires the amount of correction in the time direction in which the microphone is regarded as being present on the circumference of the distance R from the first sound source $S_1$ based on the distance R and the positions of the microphones $MI_0$ to $MI_{M-1}$. For example, in a case where the microphone $MI_0$ is present at the position of the microphone $M_{00}$ illustrated in FIG. 3A, when the position has coordinates $(X_{00}, 0)$, a distance L between the corrected microphone $M_0$ and the microphone $M_{00}$ can be calculated by $(R^2+X_{00}^2)^{1/2}-R$. As a result, the control unit 20 can acquire the amount of correction (amount of phase delay) in the time direction by $2\pi f \times L/v$ (f is the frequency of the sound wave and v is the velocity of the sound wave).

Thus, the control unit 20 acquires the pieces of digital data $y_0(t)$ to $y_{M-1}(t)$ output by the A/D converters $C_0$ to $C_{M-1}$ by the function of the sound collection data acquisition unit 21a. The control unit 20 corrects the pieces of digital data $y_0(n)$~$y_{M-1}(n)$ based on the positions of the microphones $MI_0$ to $MI_{M-1}$ and the distance R to the first sound source $S_1$, and acquires the pieces of digital data when the distances to the microphones from the first sound source $S_1$ are equal. The pieces of acquired digital data are recorded, as pieces of sound collection data 30a, on the recording medium 30. When such a correction is executed, restrictions on the physical arrangement of the microphones are reduced.

As described above, the sound collection data present at the position symmetrical with respect to the y-axis from a certain microphone can be generated by duplicating the sound collection data of the certain microphone. That is, due to the use of the function of the sound collection data acquisition unit 21a, the control unit 20 may duplicate the pieces of sound collection data collected by the microphones $MI_0$ to $MI_{M-1}$ present on the circumference of the circle of which the distance from the first sound source $S_1$ is R, and may acquire the pieces of duplicated sound collection data as pieces of sound collection data collected by microphones virtually present at positions obtained by moving the positions of the microphones $MI_0$ to $MI_{M-1}$ to positions line-symmetrical with respect to the radius (y-axis) of the circle. According to this configuration, pieces of data from a substantially large number of microphones can be collected by a small number of microphones.

The frequency spectrum acquisition unit 21b is a program module that causes the control unit 20 to execute a function acquiring the frequency spectrum in two dimensions of the circumferential direction of the circle of which the first position $P_1$ is the center and the distance R is the radius and the time direction based on the pieces of sound collection data 30a. When the pieces of sound collection data 30a are acquired in step S105, the control unit 20 acquires the frequency spectrum by a fast Fourier transform (FFT) by the function of the frequency spectrum acquisition unit 21b (step S110).

That is, the control unit 20 converts a sound pressure value indicated by each sound collection data into a luminance value and converts the luminance value into grayscale pixel data of one pixel width while referring to the pieces of sound collection data 30a obtained as pieces of data when the microphones are present on the circumference of the circle of which the distance from the first sound source $S_1$ is R. The control unit 20 performs the conversion of the data on time-series data of N consecutive points, and generates one image data constituted by N×M grayscale pixel data. The control unit 20 performs the Fourier transform on the image data by the FFT. The control unit 20 records, as frequency spectra 30b, the frequency spectra in the circumferential direction and the time direction obtained by the transform on the recording medium 30.

According to the Fourier transform described above, for example, the frequency spectra 30b in which FIG. 2B and FIG. 2D are overlapped are obtained. That is, in the present embodiment, the pieces of sound collection data 30a are acquired in a state in which the first sound source $S_1$ present at the first position $P_1$ at which the distances from the microphones $MI_0$ to $MI_{M-1}$ are equal and the second sound source $S_2$ which is another sound source are present together. Accordingly, in the frequency spectra 30b, the frequency spectrum which is obtained by the first sound source $S_1$ and is localized at the frequency 0 as illustrated in FIG. 2B and the frequency spectrum which is obtained by the second sound source $S_2$ and has the values in both the circumferential direction and the time direction as illustrated in FIG. 2D are present together.

The sound source separation unit 21c is a program module that causes the control unit 20 to execute a function of separating a first sound source spectrum which is the spectrum of the sound output from the first sound source $S_1$ and a second sound source spectrum which is the spectrum of the sound output from the second sound source $S_2$ based on the frequency spectrum.

In the present embodiment, the first sound source spectrum and the second sound source spectrum are overlapped in the region in which the frequency in the circumferential direction is zero, and the first sound source spectrum is regarded as not being present in the region in which the frequency is non-zero. Thus, the control unit 20 interpolates the region in which the frequency is zero based on the second sound source spectrum in the region in which the frequency in the circumferential direction is non-zero by the function of the sound source separation unit 21c (step S115).

Figure 6A:
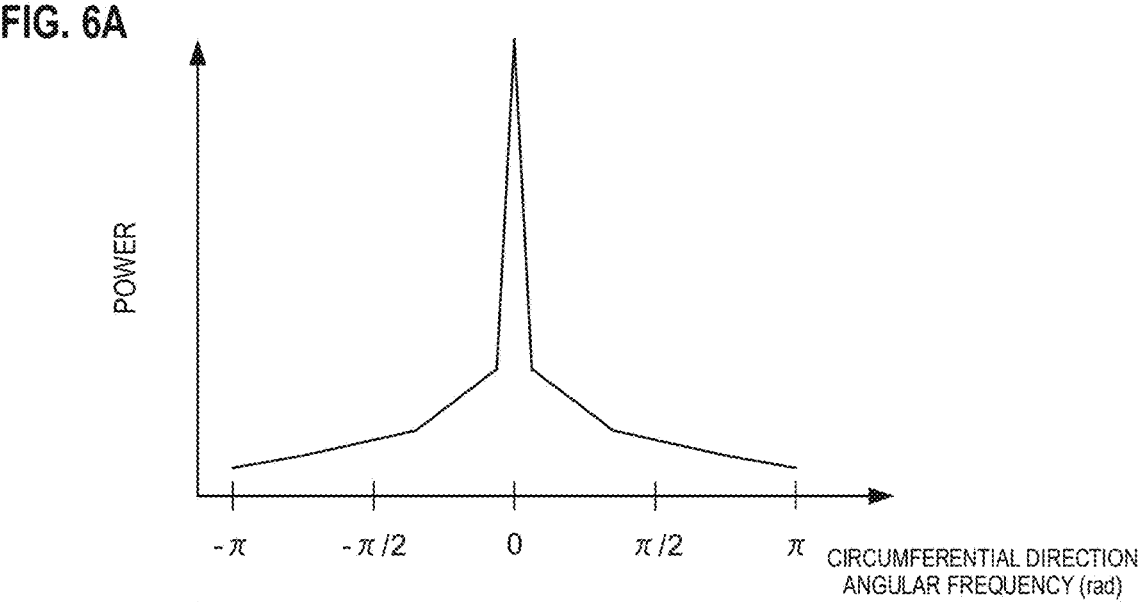
FIGS. 6A to 6C are diagrams illustrating processing of separating sound sources.

Specifically, the control unit 20 regards the frequency spectrum in the region in which the frequency in the circumferential direction is non-zero as the second sound source spectrum. FIG. 6A is a diagram illustrating a frequency spectrum at a certain time extracted from the frequency spectra 30b. As described above, in the frequency spectra 30b, there is a frequency spectrum having a large value due to the first sound source $S_1$ in the region in which the frequency is zero, but there is also a frequency spectrum having a significant value due to the second sound source $S_2$ therearound.

Figure 6B:
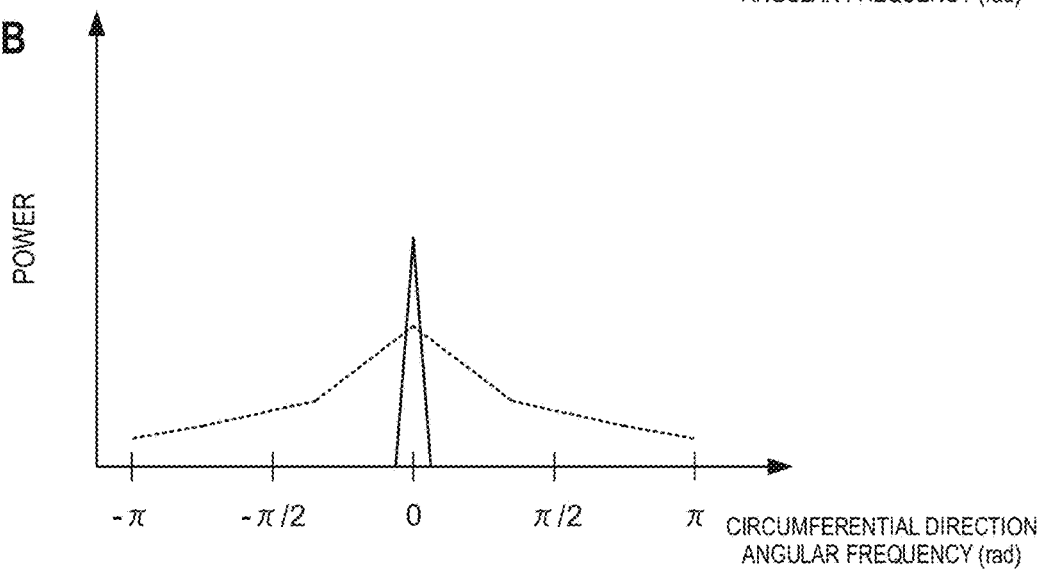
Figure 6C:
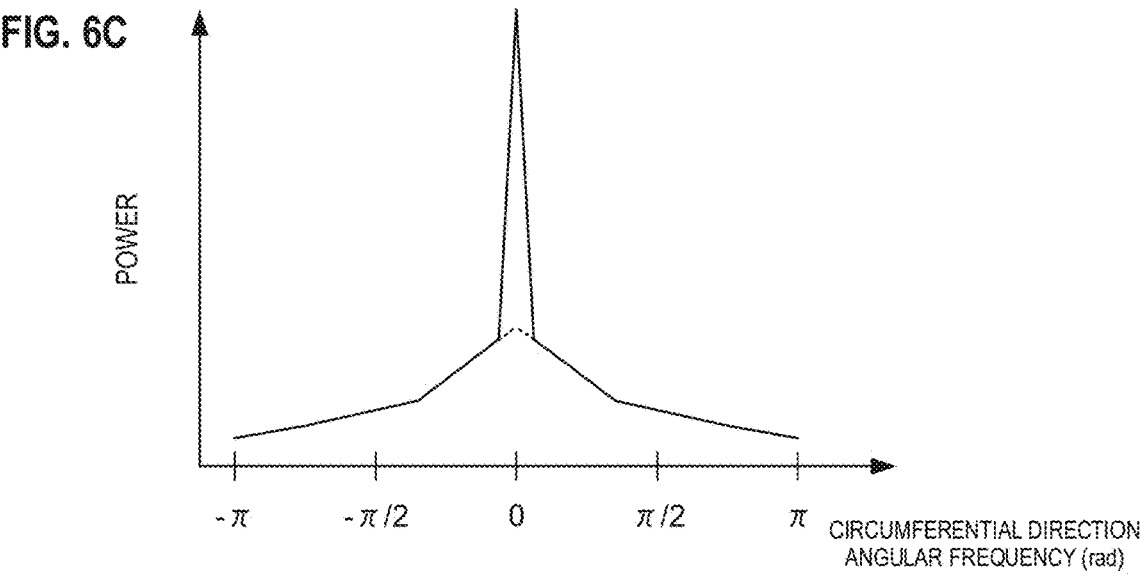

FIG. 6B is a diagram in which the frequency spectrum illustrated in FIG. 6A is separated for each sound source and the separated spectra are overlapped. A solid line is the first sound source spectrum, and a broken line is the second sound source spectrum. As stated above, since the first sound source spectrum is localized in the region in which the frequency in the circumferential direction is zero (=angular frequency is zero), when the second sound source spectrum outside this region is used, the second sound source spectrum in this region can be predicted. In the present embodiment, interpolation is performed by linearly extending the second sound source spectrum in the region in which the frequency in the circumferential direction is non-zero from both positive and negative sides toward the region in which the frequency is zero. In FIG. 6C, the second sound source spectrum estimated by the interpolation is illustrated by a broken line. The control unit 20 estimates the second sound source spectrum by performing the above processing in the entire time direction in the frequency spectra 30b.

When the second sound source spectrum in the region in which the frequency in the circumferential direction is zero is estimated, the control unit 20 acquires the first sound source spectrum by removing the second sound source spectrum from the frequency spectrum (step S120). That is, the control unit 20 removes the second sound source spectrum and separates the first sound source spectrum by subtracting the second sound source spectrum estimated in step S115 from the frequency spectra 30b.

In the above processing, when the first sound source $S_1$ is present at the position at which the distances from the plurality of microphones are equal, the second sound source spectrum is specified by using the fact that the first sound source spectrum is localized in the region in which the frequency in the circumferential direction is zero. Since the second sound source spectrum is also distributed in the region in which the frequency in the circumferential direction is non-zero, the spectrum in the region in which the frequency is zero can be accurately estimated from the spectrum in the region in which the frequency is non-zero. Thus, the second sound source spectrum and the first sound source spectrum can be accurately separated based on the estimation of the second sound source spectrum.

Subsequently, the control unit 20 converts the first sound source spectrum into sound pressure data by an inverse FFT by the function of the sound source separation unit 21c (step S125). That is, the control unit 20 executes processing of restoring the sound output from the first sound source $S_1$ based on the first sound source spectrum. As a result, the sound pressure data indicating the sound output from the first sound source $S_1$ is obtained. The sound pressure data may be used for playing the sound, may be used for analyzing and storing the sound, or may be transmitted to another device for use in another device. In any case, in the present embodiment, the first sound source spectrum is separated by using characteristics appearing when the sound source is present at the position at which the distances from the plurality of microphones are equal. Thus, the sound output from the first sound source $S_1$ can be accurately separated even in an environment in which the plurality of sound sources is present.

When the sound output from the first sound source $S_1$ is reproduced as described above, the control unit 20 determines whether or not all the sound sources are processed (step S130). That is, in the present embodiment, the pieces of sound pressure data of the plurality of sound sources can be separated, and the control unit 20 determines whether or not the separation of the sound sources is completed. The determination may be made by various factors, and various configurations may be employed, such as a configuration in which a predetermined number of sound sources are separated, and a configuration in which the sound sources are separated until the user instructs the completion of the separation of the sound sources.

When it is determined in step S130 that all the sound sources are processed, the control unit 20 ends the sound source separation processing. On the other hand, when it is not determined in step S130 that all the sound sources are processed, the control unit 20 repeats the processing of step S100 and the processing of the subsequent steps. However, when the processing of step S100 and the processing of the subsequent steps are repeated, the sound source different from the sound source for which the sound pressure data is acquired in the immediately preceding step S125 becomes the first sound source. That is, the user performs adjustment such that a new sound source is disposed in front of the distance sensor 40 (direction to be measured) by changing the orientation of the mobile terminal or the position of the user himself or herself. As a result, the new sound source becomes the first sound source, and the processing of step S100 and the processing of the subsequent steps are executed.

In step S105, the sound collection may be performed again by the microphones $MI_0$ to $MI_{M-1}$, or the pieces of already recorded sound collection data 30a may be used. For example, when the sound is continuously output from the new sound source and the sound being output is separated, the sounds are collected again by the microphones $MI_0$ to $MI_{M-1}$. On the other hand, when it is desired to further separate the sound being output when the pieces of already recorded sound collection data 30a are collected, correction may be performed based on the pieces of stored sound collection data 30a. That is, after the correction already performed based on the pieces of sound collection data 30a is canceled, the correction may be performed according to the distance from the first sound source $S_1$. In this case, it is preferable that the distance to the new first sound source $S_1$ is measured again. According to the above configuration, the sounds of the sound sources can be accurately separated in a situation in which the plurality of sound sources is present.

Figure 7:
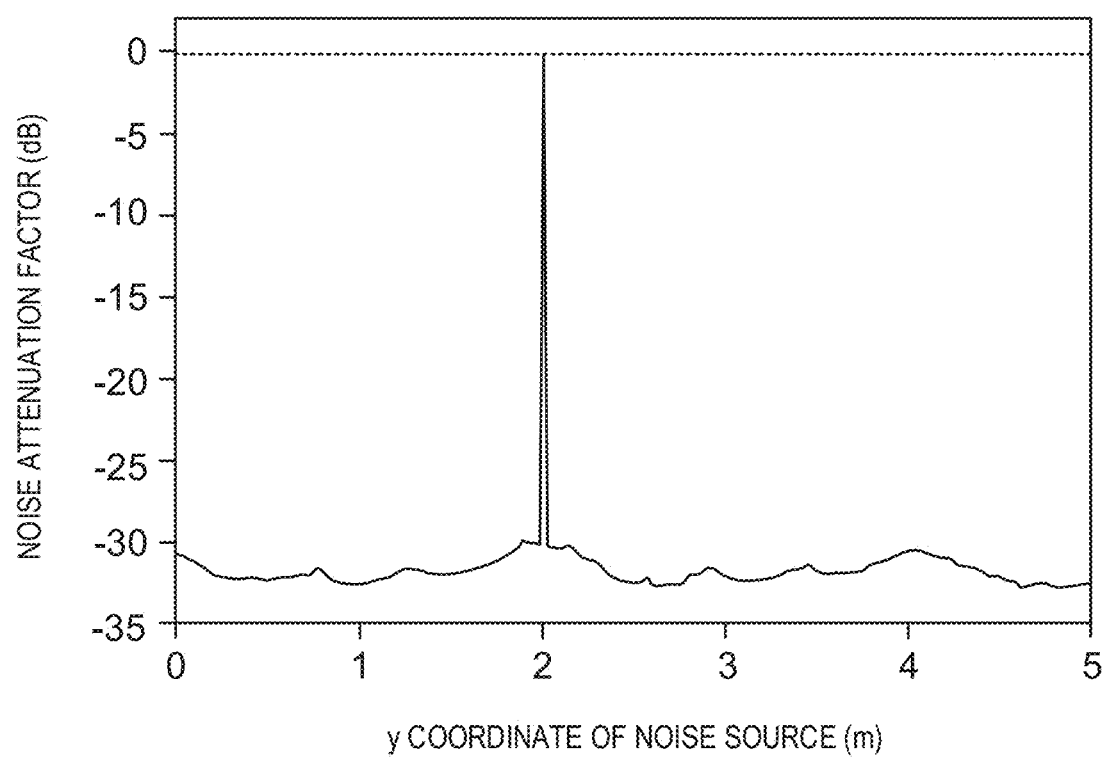
FIG. 7 is a diagram illustrating an actual example of sound source separation.

FIG. 7 is a diagram for describing an example of the processing result using the sound source separation system according to the above-described embodiment. In this example, four microphones were arranged on the x-axis like the microphones $M_{00}$ to $M_{03}$ illustrated in FIG. 3A, and four microphones were arranged at positions symmetrical with respect to the y-axis from the microphones $M_{00}$ to $M_{03}$. The distance between adjacent microphones was 2 cm.

The first sound source $S_1$ was a sound source that outputs a voice when a woman pronounced "Welcome to Japan", and was disposed at a position of 2 m from an origin on the y-axis. The second sound source $S_2$ was a sound source that outputs a voice when a man pronounced "Hello, hello". In this example, the second sound source $S_2$ was moved on the y-axis, the voices were output from the first sound source $S_1$ and the second sound source $S_2$ in a state in which the second sound source $S_2$ was disposed at each position, and the sound sources were separated.

In FIG. 7, a horizontal axis is a y coordinate of the second sound source $S_2$. Thus, the positions of the first sound source $S_1$ and the second sound source $S_2$ were the same in a state in which a value on the horizontal axis was 2 (m). In FIG. 7, a vertical axis is a noise attenuation factor. That is, in this example, measurements were performed with the microphones at each position of the second sound source $S_2$, and steps S100 to S125 were performed by using the distance to the first sound source $S_1$ as 2 m. The noise attenuation factor was calculated by comparing the noise (sound other than the output sound from the first sound source $S_1$) contained in the case where the processing was performed and the case where the processing was not performed.

As illustrated in FIG. 7, the noise attenuation factor is about 30 dB or less in all other regions except for a state in which the position of the second sound source $S_2$ is the same as the position of the first sound source $S_1$. Thus, it can be said that the first sound source $S_1$ could be accurately separated from other sounds in a very wide range except for a state in which the position of the second sound source $S_2$ is the same as the position of the first sound source $S_1$. A broken line illustrated in FIG. 7 illustrates an example of the processing result when the measurement and processing are performed by a beamforming method (delay and sum array) under the same conditions. As described above, in the beamforming method, the output sounds of two sound sources arranged in the same direction cannot be separated at all. Accordingly, the sound source separation system according to the present embodiment is a technology capable of accurately separating the output sounds of the plurality of sound sources arranged at the positions that could not be separated by the beamforming method in the past.

(3) Configuration of Sound Source Position Estimation System

Figure 8:
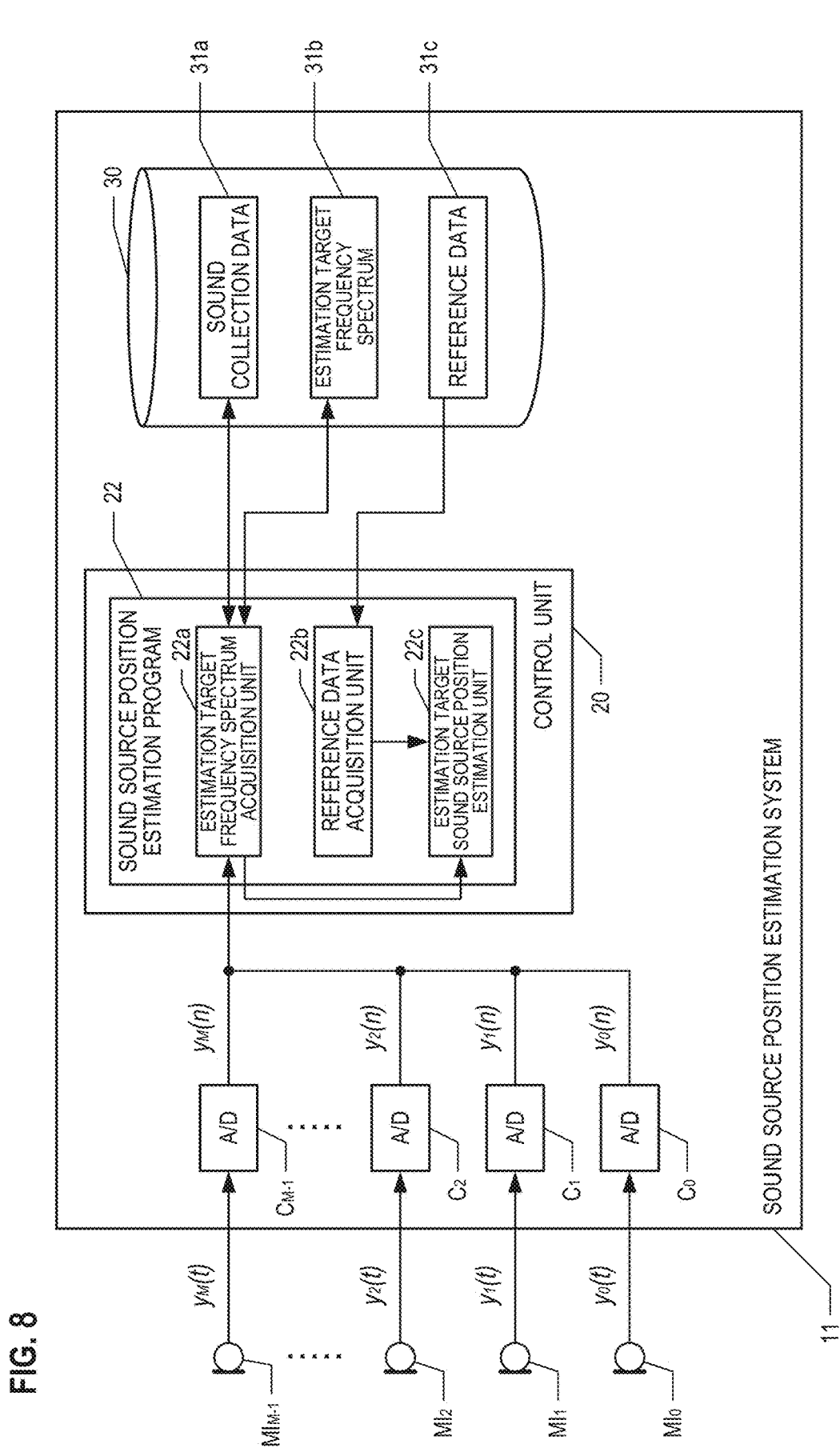
FIG. 8 is a block diagram of a sound source position estimation system.

FIG. 8 is a block diagram of a sound source position estimation system 11 according to the embodiment of the present invention. The sound source position estimation system 11 can be achieved by using the same hardware as the above-described sound source separation system 10 and changing software. In FIG. 8, the hardware required to achieve the sound source position estimation system 11 is extracted from FIG. 4, and the common hardware is illustrated by a common reference sign.

In the present embodiment, the control unit 20 can execute a sound source position estimation program 22. When the sound source position estimation program 22 is executed, the control unit 20 functions as an estimation target frequency spectrum acquisition unit 22a, a reference data acquisition unit 22b, and an estimation target sound source position estimation unit 22c. In the present embodiment, a configuration in which a position of an estimation target sound source disposed at any position on the y-axis is estimated based on the frequency spectrum obtained in the case of being measured by the plurality of microphones $MI_0$ to $MI_{M-1}$ of which the distances from the predetermined first position $P_1$ are equal is adopted. The arrangement of the plurality of microphones $MI_0$ to $MI_{M-1}$ of which the distances from the first position $P_1$ are equal may be an arrangement in a real space, or an arrangement after the correction in the time direction is performed. Here, as in FIG. 3A, it is assumed that the plurality of microphones $MI_0$ to $MI_{M-1}$ is arranged at an equal interval on the x-axis and the distances from the first position $P_1$ to the plurality of microphones $MI_0$ to $MI_{M-1}$ are regarded as being equal by correction.

The estimation target frequency spectrum acquisition unit 22a is a program module causes the control unit 20 to execute a function of collecting sounds output from the estimation target sound source by the plurality of microphones $MI_0$ to $MI_{M-1}$ present at the equal distance from the first position $P_1$ and a function of converting the pieces of collected sound into estimation target frequency spectra which are two-dimensional frequency spectra in a circumferential direction of a circle of which the first position P1 is a center and the distance is a radius and in a time direction.

Figure 9A:
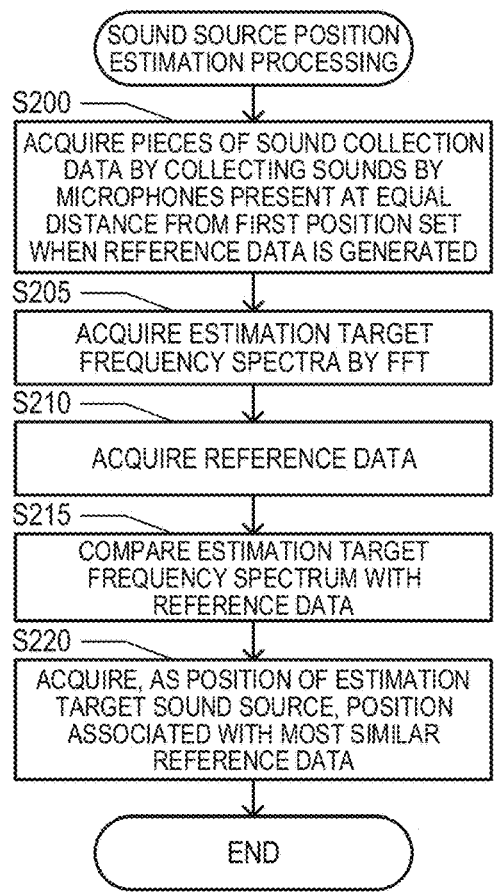
FIG. 9A is a flowchart of sound source position estimation processing.

That is, in the present embodiment, when pieces of reference data 31c are generated, the first position $P_1$ is set in advance at a specific position on the y-axis. In this situation, the control unit 20 executes sound source position estimation processing illustrated in FIG. 9A. In the sound source position estimation processing, the control unit 20 acquires the pieces of sound collection data collected by the microphones at the equal distance from the first position $P_1$ set when the pieces of reference data 31c are generated by the function of the estimation target frequency spectrum acquisition unit 22a (step S200).

Specifically, the control unit 20 sets virtual positions of the plurality of microphones $MI_0$ to $MI_{M-1}$ based on the first position $P_1$ in order to acquire the estimation target frequency spectra by the estimation target frequency spectrum acquisition unit 22a. The plurality of microphones $MI_0$ to $MI_{M-1}$ is actually arranged at an equal interval on the x-axis as illustrated in FIG. 3A, and the plurality of microphones $MI_0$ to $MI_{M-1}$ collects the sounds output from the estimation target sound source present at an unknown position in this state. As a result, the control unit 20 acquires the pieces of digital data after conversion by the A/D converters $C_0$ to $C_{M-1}$.

The control unit 20 corrects the pieces of digital data and acquires the pieces of sound collection data when the plurality of microphones $MI_0$ to $MI_{M-1}$ is present at the virtual positions. In the present embodiment, the first position $P_1$ is set in advance, and the distance R from the x-axis to the first position $P_1$ is determined in advance. Thus, the control unit 20 acquires the pieces of sound collection data corrected such that the distances from the first sound source $S_1$ to the microphones $MI_0$ to $MI_{M-1}$ is R. In the present embodiment, the x-axis in which the microphones $MI_0$ to $MI_{M-1}$ are arranged, the positions of the microphones $MI_0$ to $MI_{M-1}$ on the x-axis, and the relationship between the x-axis and the y-axis are specified in advance.

Thus, the control unit 20 acquires the amount of correction in the time direction in which the microphone is regarded as being present on the circumference of the distance R from the first sound source $S_1$ based on the distance R and the positions of the microphones $MI_0$ to $MI_{M-1}$. For example, in a case where the microphone $MI_0$ is present at the position of the microphone $M_{00}$ illustrated in FIG. 3A, when the position has coordinates $(X_{00}, 0)$, a distance L between the corrected microphone $M_0$ and the microphone $M_{00}$ can be calculated by $(R^2+X_{00}^2)^{1/2}-R$. As a result, the control unit 20 can acquire the amount of correction (mount of phase delay) in the time direction by $2\pi f \times L/v$ (f is the frequency of the sound wave and v is the velocity of the sound wave).

Thus, the control unit 20 corrects the pieces of digital data $y_0(n)$ to $y_{M-1}(n)$ based on the positions of the microphones $MI_0$ to $MI_{M-1}$ and the distance R to the first sound source $S_1$, and acquires the pieces of digital data when the distances from the first sound source $S_1$ to the microphones are regarded as being equal. The pieces of acquired digital data are recorded, as pieces of sound collection data 31a, on the recording medium 30. When such a correction is executed, restrictions on the physical arrangement of the microphones are reduced.

When the pieces of sound collection data 31a are acquired, the control unit 20 acquires the frequency spectra by the FFT by the function of the estimation target frequency spectrum acquisition unit 22a (step S205). That is, the control unit 20 converts a sound pressure value indicated by each pieces of sound collection data 31a into a luminance value and converts the luminance value into grayscale pixel data of one pixel width while referring to the pieces of sound collection data 31a obtained as pieces of data when the microphones are present on the circumference of the circle of which the distance from the first sound source $S_1$ is R.

The control unit 20 performs the above-mentioned conversion of the data on time-series data of N consecutive points, and generates one image data constituted by N×M grayscale pixel data. The control unit 20 performs the Fourier transform on the image data by the FFT. The control unit 20 records, as estimation target frequency spectra 31b, the frequency spectra in the circumferential direction and the time direction obtained by the conversion on the recording medium 30.

The reference data acquisition unit 22b is a program module that causes the control unit 20 to execute a function of acquiring the pieces of reference data in which a reference frequency spectrum when sounds output from a reference sound source are collected by the plurality of microphones and are converted into a two-dimensional frequency spectrum is associated with a position of the reference sound source. The pieces of reference data 31c is generated at least before step S200 is executed, and may be created in advance, or may be generated after the sound source position estimation processing is started.

In the present embodiment, the pieces of reference data 31c are generated after the sound source position estimation processing is started and before step S200 is executed. At this time, since the control unit 20 generates the pieces of reference data 31c after the first position $P_1$ is decided, step S200 is executed based on the first position $P_1$ decided at the time of the generation.

The pieces of reference data 31c can be defined by arranging the plurality of microphones $MI_0$ to $MI_{M-1}$ at positions of the equal distance from the first position $P_1$ and measuring the pieces of sound collection data by the microphones in a state in which sound sources are arranged at a plurality of positions on the y-axis or calculating the pieces of sound collection data. When the reference data is defined by the calculation, for example, the following calculation may be performed.

Figure 10A:
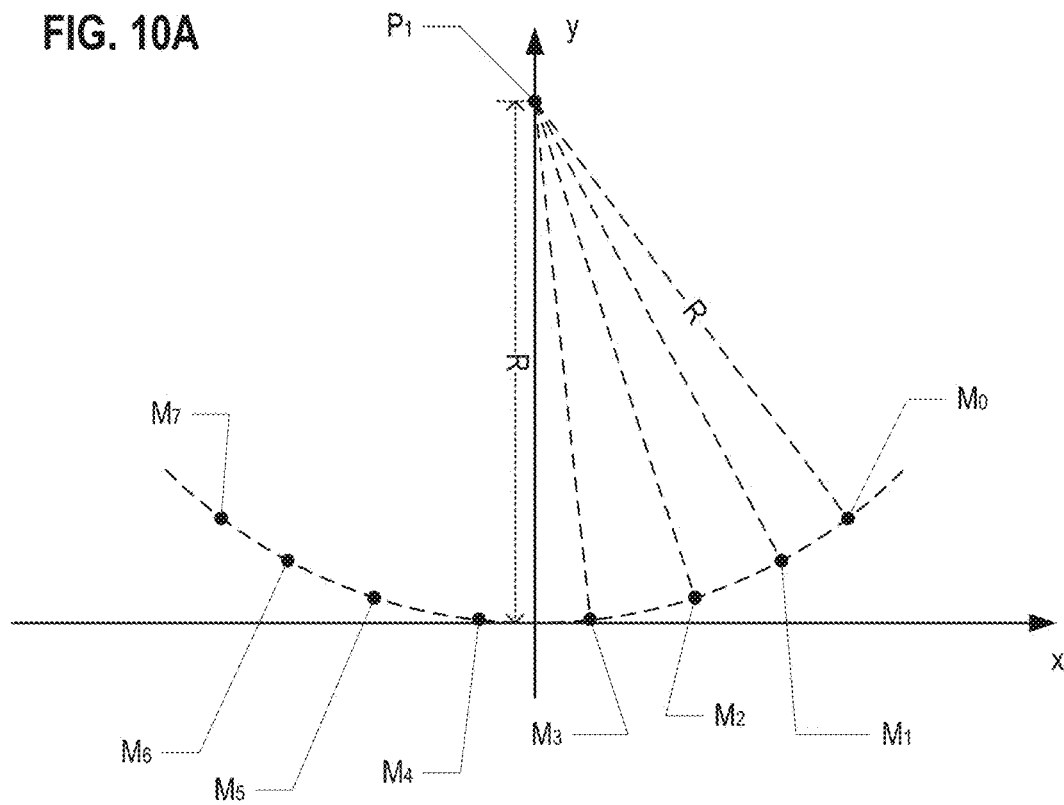
FIGS. 10A and 10B are diagrams illustrating calculation of the reference data.

First, it is assumed that the plurality of microphones $MI_0$ to $MI_{M-1}$ is arranged on a circumference of which a distance from the first position $P_1$ is constant. FIG. 10A is a diagram illustrating this state, and illustrates an example of the same state as FIG. 3A in which the microphones $M_0$ to $M_{M-1}$ (however, M−1=7 in this example) are arranged on the circumference of the distance R from the first position $P_1$. In this case, the pieces of sound collection data of a time length N obtained from M numbered of microphones $M_0$ to $M_{M-1}$ are expressed by a time n (n is an integer of 0 to N−1) and a function f(n, m). Here, the function f(n, m) is a function of a microphone number m (m is an integer of 0 to M−1).

In this case, a frequency spectrum $F(k_t, k_s)$ is given by the following Equation (1).

[Math. 1]

$$F(k_t, k_s) = \frac{1}{MN} \sum_{n=0}^{N-1} \sum_{m=0}^{M-1} f(n, m) W_t^{nk_t} W_s^{mk_s} \quad (1)$$

t is a subscript indicating the time direction and s is a subscript indicating the circumferential direction, and $W_t = e^{-2\pi j/N}$ and $W_s = e^{-2\pi j/M}$.

Figure 10B:
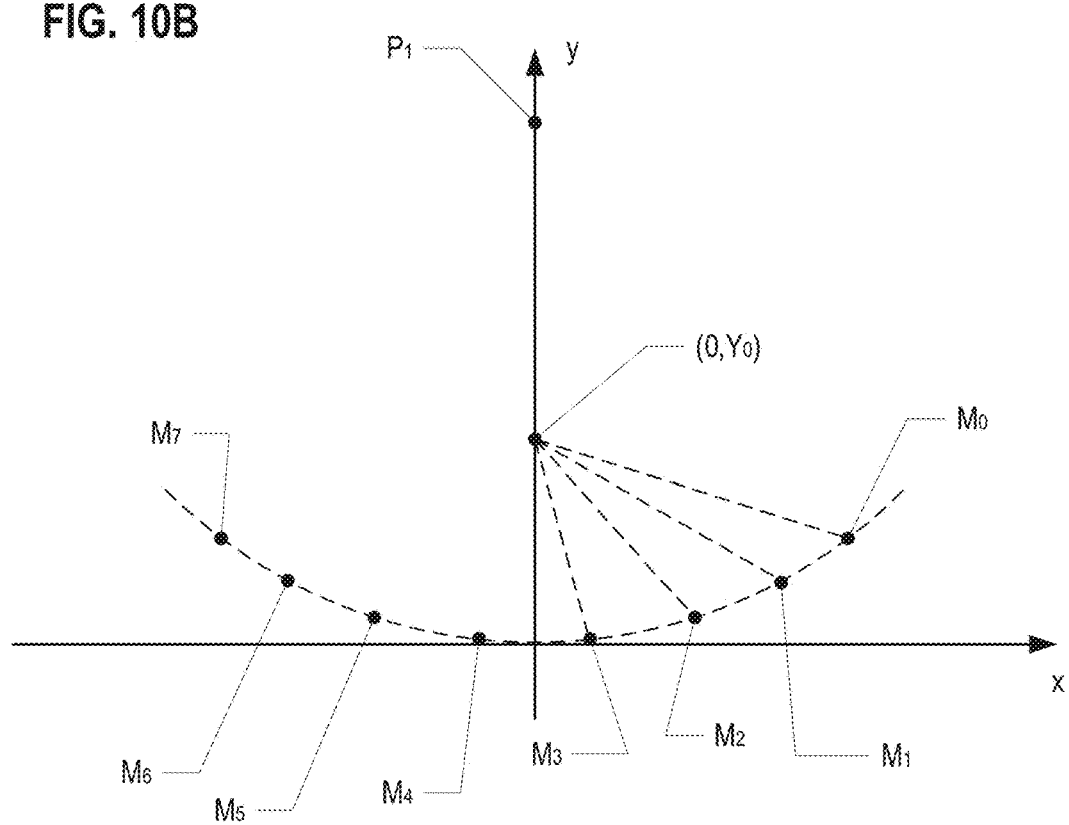

On the other hand, it is assumed that the sound source is disposed at any position $(0, Y_0)$ on the y-axis illustrated in the coordinate system of FIG. 10A, and is illustrated in FIG. 10B. In this case, when the microphone number of 0 is used as a reference, the sound collection data output from the microphone number of m is equivalent to the sound collection data of the microphone number of 0 delayed by $\tau_m = (D_m - D_0)/c$, and can be expressed as in the following Equation (2).

[Math. 2]

$$f(n,m) = f(n - \tau_m, 0) \equiv f_0(n - \tau_m) \quad (2)$$

Here, Dm is the distance from the sound source to the microphone $M_m$, and c is the speed of the sound. Dm is given by the following Equation (3) when coordinates of the microphone $M_m$ are $(X_m, Y_m)$.

$$Dm = (X_m^2 + (Y_0 - Y_m)^2)^{1/2} \quad (3)$$

When the frequency spectrum of Equation (1) is transformed by using the sound collection data given by using Equation (2), the following Equation (4) can be obtained.

[Math. 3]

$$\begin{aligned} F(k_t, k_s) &= \frac{1}{MN} \sum_{n=0}^{N-1} \sum_{m=0}^{M-1} f_0(n - \tau_m) W_t^{nk_t} W_s^{mk_s} \\ &= \frac{1}{M} \sum_{m=0}^{M-1} \left\{ \frac{1}{N} \sum_{n=0}^{N-1} f_0(n - \tau_m) W_t^{nk_t} \right\} W_s^{mk_s} \\ &= \frac{1}{M} \sum_{m=0}^{M-1} F_0(k_t) W_t^{\tau_m f_s k_t} W_s^{mk_s} \\ &= \frac{1}{M} F_0(k_t) \sum_{m=0}^{M-1} W_t^{\tau_m f_s k_t} W_s^{mk_s} \\ &= \frac{1}{M} F_0(k_t) \sum_{m=0}^{M-1} e^{-2\pi j \left( \frac{\tau_m f_s k_t}{N} + \frac{mk_s}{M} \right)} \end{aligned} \quad (4)$$

Here, $F_0(k_t)$ is the spectrum obtained by performing frequency conversion on the sound collection data of the microphone number of 0, and fs is the sampling frequency. $W_t^{\tau m f s}$ indicates a phase rotation corresponding to the delay τm.

The frequency spectrum $F(k_t, k_s)$ indicated in this manner indicates the frequency spectrum of the sounds acquired when the sound source is disposed at any position $(0, Y_0)$ on the y-axis by the plurality of microphones $MI_0$ to $MI_{M-1}$ arranged on the circumference of which the distances from the first position $P_1$ are the distance R. Thus, when the actual position of the sound source is substituted, the frequency spectrum acquired when the sound source is disposed at each position can be calculated.

Figure 9B:
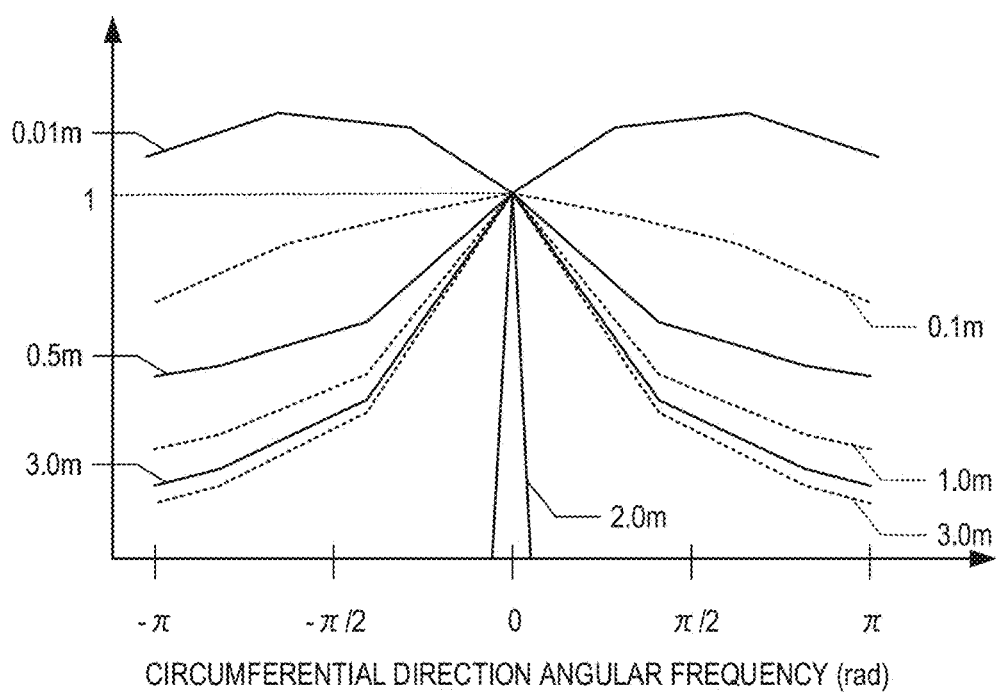
FIG. 9B is a diagram illustrating an example of reference data.

FIG. 9B illustrates the frequency spectrum calculated with the position of the sound source as a position on the y-axis at distances of 0.01, 0.1, 0.5, 1.0, 2.0, 3.0, and 4.0 m from the x-axis (that is, $Y_0 = 0.01$, 0.1, 0.5 m, and the like) when the microphones $MI_0$ to $MI_7$ are arranged at an equal interval of 2 cm in an x-axis direction. Here, $F_0(k_t) = 1$ is set, an absolute value of the frequency spectrum $F(k_t, k_s)$ is calculated, and then relative values are illustrated with a value when the frequency in the circumferential direction is zero as a relative value of 1.

As illustrated in FIG. 9B, a shape of the frequency spectrum changes as the position of the sound source changes from the x-axis to 0.01, 0.1, 0.5, 1.0, 2.0, 3.0, and 4.0 m. Thus, when a frequency spectrum similar to the actually measured estimation target frequency spectrum is specified, the position of the estimation target sound source can be estimated. In particular, the shape of the frequency spectrum changes dramatically around the first position $P_1$, which is 2.0 m from the x-axis. Thus, when the sound source is present near the position of 2.0 m from the x-axis, the position of the estimation target sound source can be accurately estimated. Of course, the number of pieces of data to be recorded as the pieces of reference data 31c is not limited to the number illustrated in FIG. 9B, and it is preferable that more pieces of data are recorded.

As described above, the frequency spectrum for each position of the sound source can be calculated in advance, and can also be actually measured and acquired. In any case, in the present embodiment, the frequency spectra acquired in a state in which the sound source (referred to as the reference sound source) is disposed at the plurality of positions on the y-axis are acquired as the reference frequency spectra, and the acquired reference frequency spectra are defined as the pieces of reference data 31c in association with the positions of the reference sound source in advance.

In the present embodiment, the positions of the reference sound source include the first position $P_1$ and a position other than the first position $P_1$. That is, since the reference frequency spectra have a significantly different shape between the first position $P_1$ and a position around the first position, the position of the reference sound source necessarily includes the first position $P_1$. Moreover, the position other than the first position $P_1$ is included in the positions of the reference sound source. The above-mentioned positions of the reference sound source are included in the pieces of reference data 31c, and thus, it is possible to define the pieces of reference data 31c that can be compared with the estimation target frequency spectra to estimate the position of the estimation target sound source.

Since the reference frequency spectra change significantly at the first position $P_1$ and the position around the first position, it is preferable that the position of the reference sound source is set with a resolution with which the position corresponding to the change can be estimated. In any case, in the state in which the pieces of reference data 31c are defined in advance, the control unit 20 acquires the pieces of reference data 31c by the function of the reference data acquisition unit 22b (step S210).

The estimation target sound source position estimation unit 22c is a program module that causes the control unit 20 to execute a function of estimating that the estimation target sound source is present at the position of the reference sound source associated with the reference frequency spectrum when the estimation target frequency spectrum and the reference frequency spectrum are similar. That is, the control unit 20 compares the estimation target frequency spectrum acquired in step S205 with the reference frequency spectrum indicated by the reference data acquired in step S210 (step S215).

The control unit 20 acquires the position associated with the most similar reference data as the position of the estimation target sound source (step S220). The similarity between the frequency spectra may be specified by various methods. For example, a configuration in which it is determined that as an integrated value of a difference between the estimation target frequency spectrum and the reference frequency spectrum becomes smaller, the frequency spectra become more similar to each other can be adopted.

According to the above configuration, the position of the sound source can be estimated. In particular, when the sound source is present near the first position $P_1$, since a profile changes significantly with a slight displacement, the position of the sound source can be accurately estimated. The position of the sound source may be defined in various aspects. That is, although the position of the sound source is defined by the distance from the x-axis in the above example, the position of the sound source may be defined by another definition, for example, a direction and a distance from the first position $P_1$ or various configurations may be adopted.

(4) Configuration of Second Sound Source Position Estimation System

Figure 11:
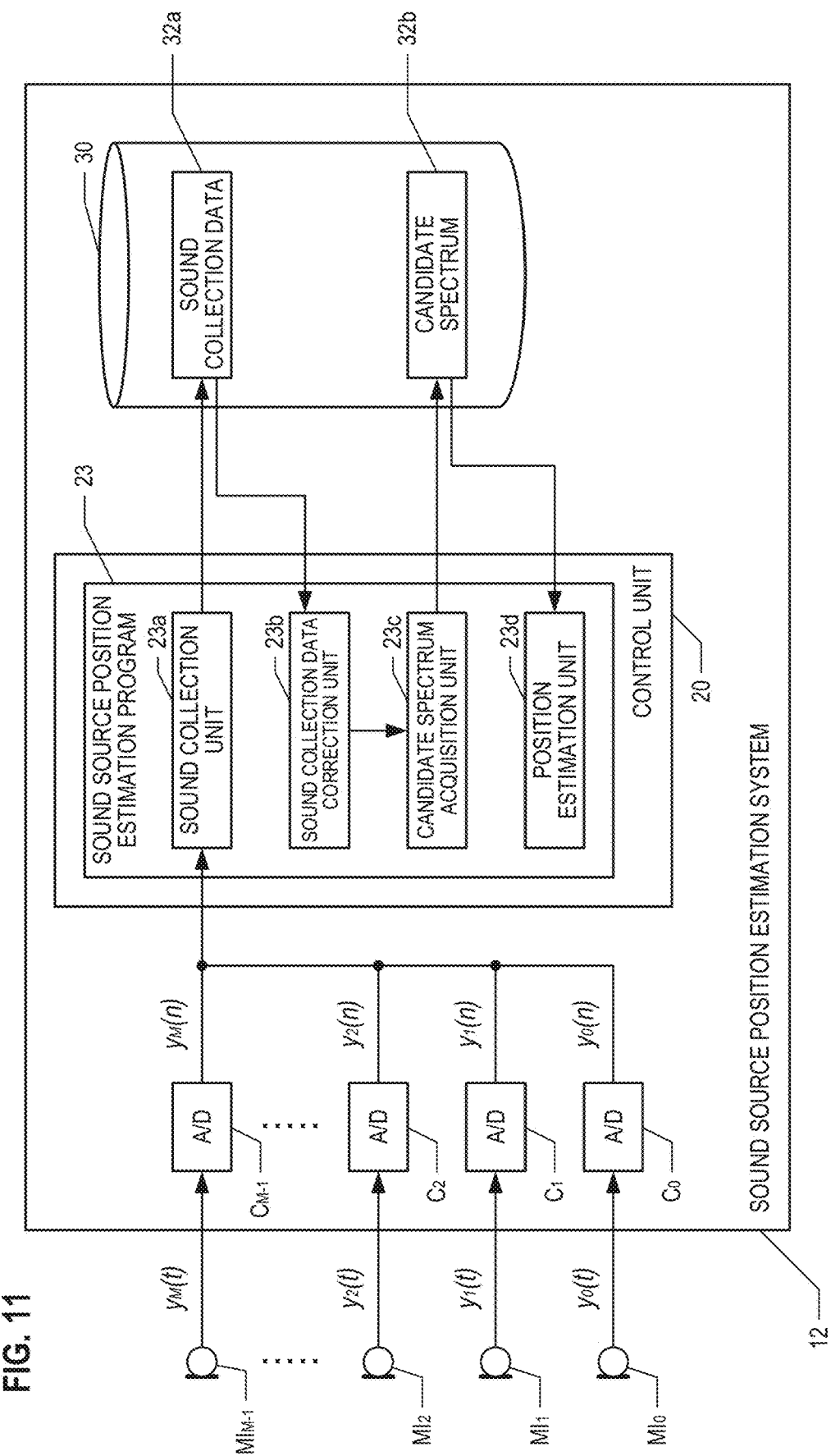
FIG. 11 is a block diagram of the sound source position estimation system.

FIG. 11 is a block diagram of a sound source position estimation system 12 according to the embodiment of the present invention. The sound source position estimation system 12 can be achieved by using the same hardware as the above-described sound source position estimation system 11 and changing the software. In FIG. 11, the hardware required to achieve the sound source position estimation system 12 is extracted from FIG. 8, and the common hardware is illustrated by a common reference sign.

In the present embodiment, the control unit 20 can execute a sound source position estimation program 23. When the sound source position estimation program 23 is executed, the control unit 20 functions as a sound collection unit 23a, a sound collection data correction unit 23b, a candidate spectrum acquisition unit 23c, and a position estimation unit 23d. In the present embodiment, a configuration in which the position of the sound source is estimated to be the first position $P_1$, and the distances from the first position $P_1$ to the plurality of microphones $MI_0$ to $MI_{M-1}$ are set to be equal is adopted. The arrangement of the plurality of microphones $MI_0$ to $MI_M-1$ of which the distances from the first position $P_1$ are equal may be an arrangement in a real space, or an arrangement after the correction in the time direction is performed. Here, as in FIG. 3A, it is assumed that the plurality of microphones $MI_0$ to $MI_{M-1}$ is arranged at an equal interval on the x-axis and the distances from the first position $P_1$ to the plurality of microphones $MI_0$ to $MI_{M-1}$ are regarded as being equal by correction.

Figure 12A:
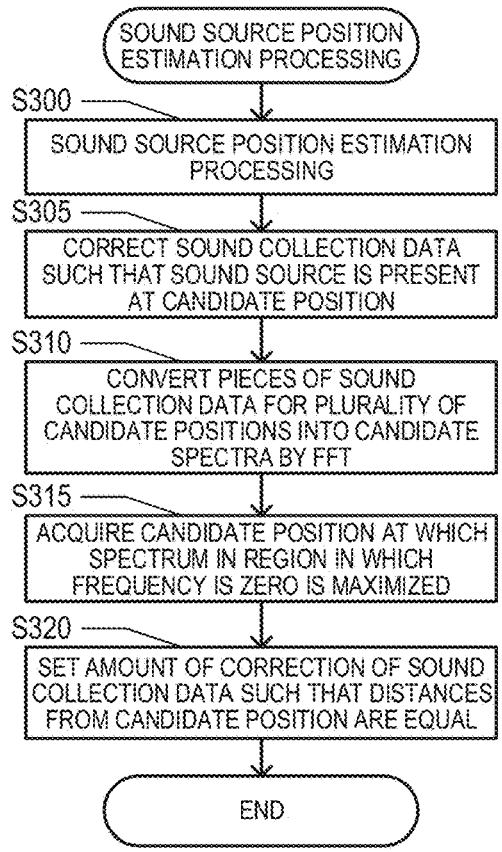
FIG. 12A is a flowchart of the sound source position estimation processing.

The sound collection unit 23a is a program module that causes the control unit 20 to execute a function of acquiring pieces of sound collection data by collecting sounds by the plurality of microphones. That is, sound source position estimation processing illustrated in FIG. 12A is started in a state in which the sound source is present on the y-axis perpendicular to the x-axis on which the plurality of microphones $MI_0$ to $MI_{M-1}$ is present. When the sound source position estimation processing is started, output signals of the plurality of microphones $MI_0$ to $MI_{M-1}$ are output as pieces of digital data from the A/D converters $C_0$ to $C_{M-1}$. The control unit 20 acquires pieces of sound collection data 32a based on the pieces of output digital data and records the pieces of sound collection data on the recording medium 30.

The sound collection data correction unit 23b is a program module that causes the control unit 20 to execute a function of performing processing of setting a plurality of candidate positions and correcting a sound collection result for each microphone in the time direction so as to be equivalent to sound collection results when the distances from the plurality of microphones to the candidate position are equal for the plurality of candidate positions. Specifically, when the pieces of sound collection data 32a are acquired, the control unit 20 corrects the pieces of sound collection data such that the sound source is present at the candidate position (step S305).

That is, the control unit 20 sets the plurality of candidate positions on the y-axis. Various methods may be used as a method for setting the candidate positions, and for example, the candidate positions may be set at regular distances. When the candidate positions are set, the control unit 20 performs processing of correcting the pieces of sound collection data 32a such that the distances from the candidate position to the plurality of microphones $MI_0$ to $MI_{M-1}$ are constant and acquiring a candidate spectrum for each candidate position.

For example, when the position $P_1$ illustrated in FIG. 3A is the candidate position, the control unit 20 acquires the pieces of sound collection data corrected such that the distances from the sound source present at the position $P_1$ to the microphones $MI_0$ to $MI_{M-1}$ are R. In the present embodiment, the x-axis in which the microphones $MI_0$ to $MI_{M-1}$ are arranged, the positions of the microphones $MI_0$ to $MI_{M-1}$ on the x-axis, and the relationship between the x-axis and the y-axis are specified in advance.

Thus, the control unit 20 acquires the amount of correction in the time direction in which the microphone is regarded as being present on the circumference of the distance R from the sound source present at the position $P_1$ based on the distance R and the positions of the microphones $MI_0$ to $MI_{M-1}$. For example, in a case where the microphone $MI_0$ is present at the position of the microphone $M_{00}$ illustrated in FIG. 3A, when the position has coordinates $(X_{00}, 0)$, a distance L between the corrected microphone $M_0$ and the microphone $M_{00}$ can be calculated by $(R^2+X_{00}^2)^{1/2}-R$. As a result, the control unit 20 can acquire the amount of correction (mount of phase delay) in the time direction by $2\pi f \times L/v$ (f is the frequency of the sound wave and v is the velocity of the sound wave).

Thus, the control unit 20 corrects the pieces of sound collection data 32a based on the positions of the microphones $MI_0$ to $MI_{M-1}$ and the distance R to the position $P_1$, and acquires the pieces of sound collection data when the distances from the sound source present at the candidate position to the microphones are regarded as being equal. The acquired sound collection data is associated with the position $P_1$, as the candidate position, assumed as the position of the sound source. The control unit 20 acquires the corrected sound collection data for each candidate position.

The candidate spectrum acquisition unit 23c is a program module that causes the control unit 20 to execute a function of acquiring frequency spectra in two dimensions in a circumferential direction of a circle of which the candidate position is a center and the distance is a radius and in a time direction for each of the plurality of candidate positions. That is, when the pieces of sound collection data are corrected in step S305, the control unit 20 converts the pieces of sound collection data for the plurality of candidate positions into candidate spectra by FFT by the function of the candidate spectrum acquisition unit 23c (step S310).

Specifically, the control unit 20 converts a sound pressure value into a luminance value and converts the luminance value into grayscale pixel data of one pixel width for each sound collection data obtained by the correction in step S305. The control unit 20 performs the above-mentioned conversion of the data on time-series data of N consecutive points, and generates one image data constituted by N×M grayscale pixel data. The control unit 20 performs the Fourier transform on the image data by the FFT. The control unit 20 records, as candidate spectrum 32b, the frequency spectrum for each of the circumferential direction and the time direction obtained by the conversion in association with the candidate position on the recording medium 30.

The position estimation unit 23d is a program module that causes the control unit 20 to execute a function of estimating that the sound source is present at the candidate position at which the frequency spectrum in the region in which the frequency in the circumferential direction is zero is maximized. That is, when the candidate spectrum is acquired in step S310, the control unit 20 acquires the candidate position at which the spectrum in the region in which the frequency is zero is maximized (step S315).

Figure 12B:
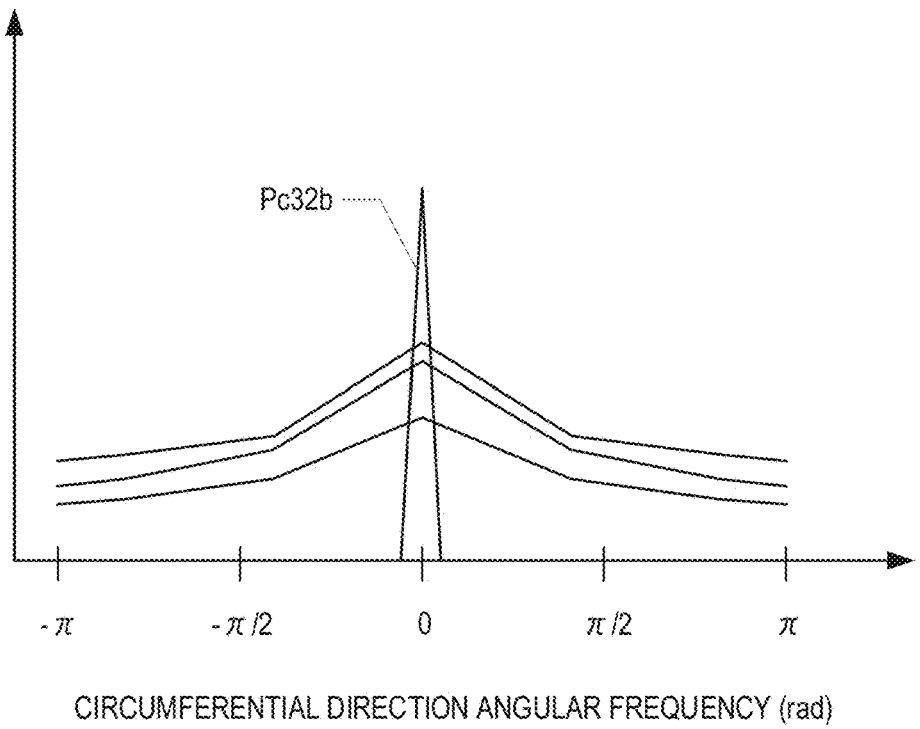
FIG. 12B is a diagram illustrating derivation of a maximum value.

Specifically, the control unit 20 acquires a value having a frequency of 0 in the circumferential direction while referring to the candidate spectrum 32b recorded on the recording medium 30. FIG. 12B is a diagram in which spectra at a certain time are extracted from a plurality of candidate spectra 32b and are overlapped. This diagram illustrates that spectra having different shapes can be obtained due to the different candidate positions. In FIG. 12B, the distances from a certain candidate position Pc to the microphones $MI_0$ to $MI_{M-1}$ are the same. Thus, a candidate spectrum Pc32b associated with the candidate position Pc has a shape extremely different from the spectra of other candidate positions, and has a maximum value. Accordingly, it is possible to easily specify that the candidate spectrum 32b associated with the candidate position Pc is maximized.

The maximum value may be specified by comparing the values in the region in which the frequency in the circumferential direction is zero in the candidate spectrum at a specific time for the plurality of candidate positions, or may be specified by another method. For example, the maximum value may be specified by acquiring the value of the candidate spectrum at multiple times in the region in which the frequency in the circumferential direction is zero, acquiring a statistical value such as a cumulative value or an average value for the plurality of candidate positions, and comparing these values.

When the candidate spectrum 32b that gives the maximum value is specified, the control unit 20 estimates that the sound source is present at the candidate position Pc associated with the candidate spectrum 32b that gives the maximum value. As described above, in the present embodiment, the control unit 20 can estimate the position of the sound source based on the candidate spectrum 32b. In the present embodiment, when the sound source is present at the candidate position Pc at which the distances from the microphones $MI_0$ to $MI_{M-1}$ are the same, the shape of the candidate spectrum is clearly different from the shapes of the other spectra as illustrated in FIG. 12B, and the value becomes large. Thus, when the candidate position Pc is the position of the sound source, the position of the sound source can be estimated particularly accurately.

In the present embodiment, after the position of the sound source is estimated, processing of collecting the sound from the sound source at this position is performed. That is, the control unit 20 sets the amount of correction of the pieces of sound collection data such that the distances from the candidate position are equal (step S320). Specifically, the control unit 20 acquires the amount of correction in the time direction (amount of phase delay: $2\pi f \times L/v$ (f is the frequency of the sound wave and v is the velocity of the sound wave) in the case of the microphone $M_{00}$ of FIG. 3A) based on the positions of the microphones $MI_0$ to $MI_{M-1}$ and a common value which is the distance to the candidate position (for example, R in the example illustrated in FIG. 3A).

Thereafter, when the control unit 20 corrects the pieces of sound collection data according to the amount of correction and performs the same processing as in steps S110 to S125, only the sound from the sound source present at the candidate position can be extracted.

In the present embodiment, when there is a plurality of maximum values, the control unit 20 may estimate that the sound source is present at each candidate position associated with the candidate spectrum 32b that gives each maximum value. In this case, when the amount of correction of the pieces of sound collection data is set, for example, a configuration in which the user is inquired as to which candidate position is to be set can be adopted. Fine adjustment may be performed after coarse adjustment is performed. For example, after a plurality of candidate positions may be set with a coarse density and candidate positions may be temporarily set based on the maximum value, a plurality of candidate positions is set at a higher density in a predetermined range including the temporarily set positions, and the candidate positions may be set in detail based on the maximum value.

(5) Other Embodiments

The above embodiment is an example for implementing the present invention, and various other embodiments can be adopted as long as characteristics of the frequency spectrum of the sound source of which the distances from the plurality of microphones are at a constant position are effectively used. Although the configuration in which the separation of the sound sources and the estimation of the positions of the sound sources are performed based on the frequency spectra has been described in the above embodiment, the configuration is an example. Thus, a configuration in which the separation of the sound sources is performed by using a learning result by performing machine learning based on other methods, for example, training data in which the frequency spectrum after the separation is associated with the frequency spectrum may be used. Of course, a configuration in which the estimation of the positions of the sound sources is performed by using the learning result by performing machine learning based on training data in which the position of the sound source is associated with the frequency spectrum may be used.

The sound collection data may be the training data instead of the frequency spectrum. For example, a configuration in which the separation of the sound sources is performed by using a learning result by performing machine learning based on training data in which the separated sound collection data is associated with the sound collection data may be used. A configuration in which the estimation of the positions of the sound sources is performed by using the learning result by performing the machine learning based on the training data in which the position of the sound source is associated with the sound collection data.

One or more embodiments of the present invention may be achieved in devices other than the mobile terminal. For example, the sound source separation system and the sound source position estimation system are arranged in the vehicle compartment, and thus, a voice interface that receives a voice instruction of a driver in a state in which a conversation, music playing, or the like is being performed in a vehicle compartment may be achieved. By doing so, since the voice instruction of the driver can be separated from a driving noise, other voices in the vehicle compartment, and the like, a recognition rate of the voice instruction is improved.

The sound source separation system and the sound source position estimation system may be used together with a camera included in the mobile terminal. For example, when a video is captured with the mobile terminal including the camera, the sound source separation system and the sound source position estimation system may be used in a case where there is an attempt to record a voice of a specific sound source together with the video or in a case where there is an attempt to record the video in a state in which a voice is separated for each sound source. A usage aspect in which all the sound collection results of the plurality of microphones are recorded and the sounds from different sound sources present at different positions are extracted later can also be achieved.

Although the above-described sound source separation system 10 includes the distance sensor 40, the sound source separation system 10 in which the distance measurement by the distance sensor 40 is not performed may be achieved. For example, when a sound source present in a certain range such as a mouth of the driver in the vehicle compartment is used as a target, the sound source separation system 10 set such that the first position $P_1$ is included in this range is achieved, the distance sensor 40 is unnecessary.

Although it has been described that the sound source is regarded as being present on the y-axis in the above-described embodiment, the generality is not lost even when the sound source is not present on the y-axis. For example, the first position can be changed by shifting the sound collection results of the plurality of microphones in the time direction. When such a shift in the time direction is used, it is possible to perform correction such that a position that is not present on the y-axis can be regarded as the first position. No matter where the sound source is positioned, it is possible to achieve a state in which the sound source is present (or nearly present) on the y-axis by moving the sound source separation system or the sound source position estimation system.

The sound source separation system and the sound source position estimation system may be achieved by a plurality of devices, and may be systems in which Fourier transform, the correction of the sound collection data, and the like are performed on a server and the providing of the separated voice, the providing of the estimated position of the sound source, and the like are performed on the client. Of course, the elements constituting the sound source separation system and the sound source position estimation system, for example, the sound collection data acquisition unit 21a, the frequency spectrum acquisition unit 21b, the sound source separation unit 21c, the estimation target frequency spectrum acquisition unit 22a, the reference data acquisition unit 22b, the estimation target sound source position estimation unit 22c, the sound collection unit 23a, the sound collection data correction unit 23b, the candidate spectrum acquisition unit 23c, the position estimation unit 23d, and the like may be distributed and present in different devices. Some configurations of the above-described embodiments may be omitted, and a processing order may be changed or omitted.

The sound collection data acquisition unit may acquire the pieces of sound collection data by collecting the sounds output from the first sound source present at the first position at which the distances from the plurality of microphones are equal and the second sound source present at the position other than the first position by the plurality of microphones. That is, the sound collection data acquisition unit may collect the sounds in a state in which the sound sources are arranged such that the first sound source spectrum of the sound output from the first sound source can be distinguished from the second sound source spectrum.

Although it has been described in the embodiment of the sound source separation system that M numbered of (M≥3) microphones are used, the number of the plurality of microphones may be 2 or more, and the number is not limited. The plurality of microphones may have the equal distance from the first sound source, and the distances may be in a state in which the actual distances in the real space are equal or in a state in which the virtual distances are equal. That is, when the pieces of sound collection data are corrected in the time direction and the effective distances between the plurality of microphones and the sound source are changed, the distances between the microphones and the first sound source may be defined by the effective distances.

It is preferable that the plurality of microphones is microphones having the same characteristics (for example, a plurality of microphones having the same material, size, and configuration). An aspect of the plurality of microphones is not limited, and various microphones may be used in addition to the above-mentioned MEMS microphone.

The first sound source spectrum can be clearly distinguished from the second sound source spectrum by the presence of the first sound source at the first position. Thus, an error may be included in the first position as long as the first sound source spectrum and the second sound source spectrum can be distinguished. The distances from the first sound source to the microphones may have an error as long as the first sound source spectrum and the second sound source spectrum can be distinguished.

A state in which the first sound source is present at the first position may be achieved by various means, a state in which the first sound source is present at the first position by artificially moving the sound source separation system or the like may be achieved, or a state in which the first sound source is present at the first position by correcting the sound collection data may be achieved. The sound collection data may indicate the sound collected by each microphone, and is, for example, data indicating a temporal change of the sound pressure.

The frequency spectrum acquisition unit may acquire the frequency spectra in two dimensions of the circumferential direction of the circle of which the first position is the center and the distance is the radius and the time direction based on the pieces of sound collection data. That is, the frequency spectrum acquisition unit can be configured such that the frequency spectrum acquisition unit converts the pieces of sound collection data into the frequency spectra in a two-dimensional direction defined by the circumferential direction in which the microphones are distributed and the time direction indicating the temporal change of the sound pressure in each microphone.

The circumferential direction of the circle may be on the circumference of the circle of which the first position is the center and the distance between the microphone and the first position is the radius. As described above, a state in which the distances from the first position to the plurality of microphones are constant can also be achieved by correcting the pieces of sound collection data in the time direction. Thus, even when pieces of sound collection data of a plurality of microphones arranged on a straight line are arranged in a specific straight line direction and coordinate axes are defined such that a sound pressure of each sound collection data changes in the time direction perpendicular to the straight line, it is possible to interpret that the frequency spectra are analyzed in two dimensions in the circumferential direction and the time direction. That is, when a state in which the distances from the first position to the plurality of microphones are constant may be achieved by the correction of the pieces of sound collection data in the time direction, it can be said that the analysis is performed in the two dimensions of the circumferential direction and the time direction.

The sound source separation unit can separate the first sound source spectrum which is the spectrum of the sound output from the first sound source and the second sound source spectrum which is the spectrum of the sound output from the second sound source from each other based on the frequency spectra. That is, since the first sound source spectrum is an extremely characteristic spectrum different from the second sound source spectrum, the spectrum for each sound source can be separated by performing at least one of processing of extracting the first sound source spectrum which is the characteristic spectrum and processing of removing the characteristic spectrum and leaving the second sound source spectrum.

The first sound source spectrum and the second sound source spectrum obtained by the separation may be used for various purposes. That is, various configurations can be adopted in addition to the configuration in which the processing of restoring the sound is performed as in the above-described embodiment. For example, a configuration in which the characteristics of the frequency spectrum of each sound source are analyzed or evaluated may be adopted.

Although the processing of restoring the sound output from the first sound source based on the first sound source spectrum is performed in the above-described embodiment, processing of restoring the sound output from the second sound source based on the second sound source spectrum may be performed, or processing of restoring the sounds of both the first sound source and the second sound source may be performed. The processing of restoring the sound output from the second sound source based on the second sound source spectrum can be achieved by processing of performing an inverse Fourier transform on the second sound source spectrum obtained by removing the first sound source spectrum.

The region in which the frequency in the circumferential direction is zero may be a region in which the first sound source spectrum is localized in the circumferential direction due to the presence of the sound source at the first position at which the distances from the plurality of microphones are equal, and for example, this region becomes narrower as the first sound source accurately matches on the first position, and become narrower as the distances from the plurality of microphones to the first position accurately match for the plurality of microphones. Thus, the region in which the frequency is zero may have a width in consideration of a degree to which frequency components of the first sound source spectrum spread in the circumferential direction according to an error thereof or the like, that is, such that the first sound source spectrum can be extracted. The region in which the frequency in the circumferential direction is non-zero may be set as a frequency region in which the first sound source spectrum has no value.

The estimation of the second sound source spectrum in the region in which the frequency in the circumferential direction is zero may be performed by various interpolations. That is, various configurations can be adopted like a linear interpolation in which the second sound source spectrum in the region in which the frequency in the circumferential direction is non-zero is extended to the region in which the frequency is zero as in the above-described embodiment may be used, another linear interpolation, or an interpolation in which the spectrum approximates with a polynomial or the like. Both the frequencies on the positive and negative sides may be referred to in referring to the second sound source spectrum of which the frequency is non-zero, or the frequency on only the positive side or only the negative side may be referred to.

The sound collection data acquisition unit may be configured to acquire the pieces of sound collection data collected by the plurality of microphones arranged on the circumference of the circle having the first position as the center. That is, the pieces of sound collection data may be acquired in a state in which the plurality of microphones is actually arranged on the circumference of the circle having the first position as the center. Of course, the first position can be changed by changing the positions of the plurality of microphones. Various actuators may be adopted as the configuration for changing the position of the microphone, for example, when the microphone is the MEMS microphone, a mechanism for driving the microphone by the MEMS may be used.

As in the present invention, a method of effectively using the characteristics of the frequency spectrum of the sound source present at the position at which the distances from the plurality of microphones are constant can be adopted as a program or a method. The system, program, and method described above can be assumed to be achieved as a single device or by a plurality of devices, and include various aspects. For example, it is possible to provide a mobile terminal including the above units. The system, program, and method can be appropriately changed such that some are software and some are hardware. The invention is also established as a recording medium for a program that controls a system. Of course, the recording medium of the software may be a magnetic recording medium, or a semiconductor memory, and any recording medium to be developed in the future can be considered in exactly the same way.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

10 Sound source separation system
20 Control unit
21 Sound source separation program
21a Sound collection data acquisition unit
21b Frequency spectrum acquisition unit
21c Sound source separation unit
30 Recording medium
30a Sound collection data
30b Frequency spectrum
11 Sound source position estimation system
22 Sound source position estimation program
22a Estimation target frequency spectrum acquisition unit
22b Reference data acquisition unit
22c Estimation target sound source position estimation unit
31a Sound collection data
31b Estimation target frequency spectrum
31c Reference data
12 Sound source position estimation system
23 Sound source position estimation program
23a Sound collection unit
23b Sound collection data correction unit
23c Candidate spectrum acquisition unit
23d Position estimation unit
32a Sound collection data
32b Candidate spectrum
40 Distance sensor
$C_0$ to $C_{M-1}$ A/D converter
$MI_0$ to $MI_{M-1}$ Microphone

The invention claimed is:

1. A sound source separation system comprising:
a controller that:
acquires pieces of sound collection data with microphones that collect sounds output from a first sound source and a second sound source, wherein
the first sound source is at a first position at which effective distances from the microphones are equal, and
the second sound source is at a second position different from the first position;
acquires, based on the sound collection data, frequency spectra in two dimensions of a circumferential direction of a circle and a time direction, wherein
the first position is a center of the circle, and
each of the effective distances is a radius of the circle; and
separates, from the frequency spectra, a first sound source spectrum and a second sound source spectrum, wherein
the first sound source spectrum is a spectrum of a sound output from the first sound source, and
the second sound source spectrum is a spectrum of a sound output from the second sound source.

2. The sound source separation system according to claim 1, wherein
the controller executes at least one of:
restoring the sound output from the first sound source based on the first sound source spectrum; and
restoring the sound output from the second sound source based on the second sound source spectrum.

3. The sound source separation system according to claim 1, wherein
the controller:
determines a frequency spectrum in a non-zero region in which a frequency in the circumferential direction is non-zero as the second sound source spectrum in the non-zero region,
estimates the second sound source spectrum in a zero region in which the frequency in the circumferential direction is zero by interpolating a frequency spectrum in the zero region based on the second sound source spectrum in the non-zero region, and
separates the first sound source spectrum by removing the estimated second sound source spectrum from the frequency spectra in the zero region.

4. The sound source separation system according to claim 1, wherein, when actual distances from the first position to the microphones are not equal, the controller acquires the sound collection data by correcting a first sound collection result for each of the microphones in the time direction to be equivalent to a second sound collection result when the actual distances are equal.

5. The sound source separation system according to claim 1, wherein
the controller:
duplicates the sound collection data acquired with the microphones located on a circumference of the circle, and acquires the duplicated sound collection data as the sound collection data acquired with the microphones virtually located at positions obtained by moving positions of the microphones to positions line-symmetrical with respect to the radius of the circle.

6. The sound source separation system according to claim 1, wherein the controller acquires the sound collection data with the microphones arranged on a circumference of the circle.

7. A sound source position estimation system comprising: a controller that:
collects with microphones a sound output from an estimation target sound source, wherein effective distances from a first position to the microphones are equal;
converts the collected sound into an estimation target frequency spectrum that is a two-dimensional frequency spectrum in a circumferential direction of a circle and a time direction, wherein
the first position is a center of the circle, and
each of the effective distances is a radius of the circle;
acquires pieces of reference data in which reference frequency spectra are associated with positions of reference sound sources, wherein the reference frequency spectra are acquired when sounds output from the reference sound sources are collected with the microphones and converted into the two-dimensional frequency spectra; and
when the estimation target frequency spectrum is similar to one of the reference frequency spectra, estimates that the estimation target sound source is at one of the positions of the reference sound sources associated with the one of reference frequency spectra,
wherein the positions of the reference sound sources respectively associated with the reference frequency spectra include the first position and a second position different from the first position.

8. A sound source position estimation system comprising: a controller that:
acquires pieces of sound collection data by collecting sounds with microphones;
sets a plurality of candidate positions;
for each of the candidate positions, corrects a first sound collection result for each of the microphones in a time direction to be equivalent to a second sound collection result when effective distances from the microphones to each of the candidate positions are equal;
for each of the candidate positions, acquires frequency spectra in two dimensions of a circumferential direction of a circle and the time direction, wherein each of the candidate positions is a center of the circle, and
each of the effective distances is a radius of the circle; and
estimates that a sound source is at, among the candidate positions, a candidate position at which a frequency spectrum in a zero region in which a frequency in the circumferential direction is zero becomes largest.

9. A sound source separation method comprising:
acquiring pieces of sound collection data with microphones that collect sounds output from a first sound source and a second sound source, wherein
the first sound source is at a first position at which effective distances from the microphones are equal, and
the second sound source is at a second position different from the first position;
acquiring frequency spectra in two dimensions of a circumferential direction of a circle and a time direction based on the sound collection data, wherein
the first position is a center of the circle, and
each of the effective distances is a radius; and
separating, from the frequency spectra, a first sound source spectrum and a second sound source spectrum, wherein
the first sound source spectrum is a spectrum of a sound output from the first sound source, and
the second sound source spectrum is a spectrum of a sound output from the second sound source.

10. A non-transitory computer readable recording medium storing instructions for sound source separation that cause a computer to:
acquire pieces of sound collection data with microphones that collect sounds output from a first sound source and a second sound source, wherein
the first sound source is at a first position at which effective distances from the microphones are equal, and
the second sound source is at a second position different from the first position;
acquire frequency spectra in two dimensions of a circumferential direction of a circle and a time direction based on the sound collection data, wherein
the first position is a center of the circle, and
each of the effective distances is a radius of the circle; and
separate, from the frequency spectra, a first sound source spectrum and a second sound source spectrum, wherein
the first sound source spectrum is a spectrum of a sound output from the first sound source, and
the second sound source spectrum is a spectrum of a sound output from the second sound source.

* * * * *